(12) United States Patent
Ribeiro et al.

(10) Patent No.: US 10,671,186 B2
(45) Date of Patent: Jun. 2, 2020

(54) AUTONOMOUS HAPTIC STYLUS

(71) Applicant: Microsoft Technology Licensing, LLC, Redmond, WA (US)

(72) Inventors: Flavio Protasio Ribeiro, Bellevue, WA (US); Anatoly Yuryevich Churikov, Las Vegas, NV (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/182,946

(22) Filed: Jun. 15, 2016

(65) Prior Publication Data
US 2017/0364167 A1  Dec. 21, 2017

(51) Int. Cl.
*G06F 3/0354* (2013.01)
*G06F 3/044* (2006.01)
(Continued)

(52) U.S. Cl.
CPC .......... *G06F 3/03545* (2013.01); *G06F 3/016* (2013.01); *G06F 3/0383* (2013.01); *G06F 3/044* (2013.01); *G06F 3/0416* (2013.01)

(58) Field of Classification Search
CPC .. G06F 3/016; G06F 3/03545; G06F 3/03646; G06F 3/038; G06F 3/0383;
(Continued)

(56) References Cited

U.S. PATENT DOCUMENTS 3,732,369 A * 5/1973 Cotter .................. G06F 3/044
178/20.04
4,024,500 A  5/1977 Herbst et al.
(Continued)

FOREIGN PATENT DOCUMENTS

EP  2492782 A1  8/2012
EP  2687949 A1  1/2014
(Continued)

OTHER PUBLICATIONS

Fiene, et al., "Event-Based Haptic Tapping with Grip Force Compensation", In 14th Symposium on Haptic Interfaces for Virtual Environment and Teleoperator Systems, Mar. 25, 2006, pp. 117-123.
(Continued)

*Primary Examiner* — Nathan Danielsen
(74) *Attorney, Agent, or Firm* — Arent Fox LLP

(57) ABSTRACT

An autonomous haptic stylus provides tactile feedback to a user writing or drawing on a smooth, uniform, touch-sensitive, glass display screen of a tablet, laptop computer, credit card point of sale device, or other device allowing a user to write or draw thereon. The stylus has an electrostatic detection sensor or a force/pressure sensor, which allows the stylus to detect certain characteristics of the display screen and to autonomously determine the position and/or velocity of the stylus on the display screen based on those characteristics. The position and/or velocity can be used to tailor the tactile feedback to the user. A display screen digitizer that provides driving signals for the row and column electrodes of a touch-sensitive display screen can be modified to transmit row and column information over the electrodes to allow a stylus to determine its position.

22 Claims, 12 Drawing Sheets

(51) Int. Cl.
*G06F 3/01* (2006.01)
*G06F 3/038* (2013.01)
*G06F 3/041* (2006.01)

(58) Field of Classification Search
CPC ...... G06F 3/0412; G06F 3/0416; G06F 3/044; G06F 3/0487–04886; G06F 2203/0384; G06F 2203/04101; G06F 2203/04108
See application file for complete search history.

(56) References Cited

U.S. PATENT DOCUMENTS

| | | |
|---|---|---|
| 4,686,331 A | 8/1987 | Burgess |
| 5,774,582 A | 6/1998 | Gat et al. |
| 5,837,947 A | 11/1998 | Teterwak |
| 6,188,392 B1 | 2/2001 | O'Connor et al. |
| 6,271,836 B1 | 8/2001 | Makinwa |
| 6,788,297 B2 | 9/2004 | Itoh et al. |
| 7,119,796 B2 | 10/2006 | Van Dam et al. |
| 7,281,664 B1 | 10/2007 | Thaeler et al. |
| 8,378,797 B2 | 2/2013 | Pance et al. |
| 8,390,578 B2 | 3/2013 | Chino |
| 8,469,806 B2 | 6/2013 | Grant et al. |
| 8,493,359 B2 | 7/2013 | Wright et al. |
| 8,593,409 B1 | 11/2013 | Heubel et al. |
| 2005/0116940 A1* | 6/2005 | Dawson ............... G06F 3/03545 345/179 |
| 2006/0238517 A1 | 10/2006 | King et al. |
| 2007/0024597 A1* | 2/2007 | Matsuoka ........... G06F 3/04883 345/173 |
| 2008/0150911 A1 | 6/2008 | Harrison |
| 2009/0167704 A1 | 7/2009 | Terlizzi et al. |
| 2009/0251441 A1* | 10/2009 | Edgecomb ......... G06F 3/03545 345/179 |
| 2009/0314552 A1 | 12/2009 | Underwood et al. |
| 2009/0322496 A1 | 12/2009 | Da Costa |
| 2010/0001973 A1* | 1/2010 | Hotelling ................ G06F 3/044 345/174 |
| 2010/0090813 A1 | 4/2010 | Je et al. |
| 2010/0315364 A1 | 12/2010 | Miyake |
| 2011/0102349 A1 | 5/2011 | Harris |
| 2011/0260996 A1 | 10/2011 | Henricson |
| 2012/0050207 A1 | 3/2012 | Westhues et al. |
| 2012/0068964 A1 | 3/2012 | Wright et al. |
| 2012/0127088 A1 | 5/2012 | Pance et al. |
| 2012/0223880 A1 | 9/2012 | Birnbaum et al. |
| 2013/0038603 A1 | 2/2013 | Bae |
| 2013/0181902 A1 | 7/2013 | Hinckley et al. |
| 2013/0227410 A1 | 8/2013 | Sridhara et al. |
| 2013/0265286 A1 | 10/2013 | Da costa et al. |
| 2013/0300668 A1 | 11/2013 | Churikov et al. |
| 2013/0307789 A1 | 11/2013 | Karamath et al. |
| 2013/0328814 A1 | 12/2013 | Birnbaum |
| 2014/0071095 A1* | 3/2014 | Godsill ................ G06F 3/0418 345/177 |
| 2014/0104188 A1* | 4/2014 | Bakken .................. G06F 3/044 345/173 |
| 2014/0146021 A1 | 5/2014 | Trethewey et al. |
| 2014/0168142 A1* | 6/2014 | Sasselli ............... G06F 3/03545 345/174 |
| 2014/0192247 A1 | 7/2014 | Cheong et al. |
| 2014/0340328 A1 | 11/2014 | Kameyama et al. |
| 2015/0054751 A1 | 2/2015 | Hsiang et al. |
| 2015/0169056 A1* | 6/2015 | Weddle ............... G06F 3/03545 345/173 |
| 2015/0338930 A1* | 11/2015 | Hara ..................... G06F 3/0416 345/158 |
| 2016/0041681 A1 | 2/2016 | Hamaguchi |
| 2016/0202760 A1 | 7/2016 | Churikov et al. |
| 2017/0024028 A1* | 1/2017 | Valentine ............ G06F 3/03545 |

FOREIGN PATENT DOCUMENTS

| | | |
|---|---|---|
| WO | 0124158 A1 | 4/2001 |
| WO | 0191100 A1 | 11/2001 |

OTHER PUBLICATIONS

"International Search Report and Written Opinion Issued in PCT Application No. PCT/US2017/036654", dated Aug. 24, 2017, 19 Pages.

Pahud, Michel, "Actuated 3-D Display with Haptic Feedback", Retrieved From: http://research.microsoft.com/apps/video/default.aspx?id=194835, Jul. 1, 2013, 1 Page.

"Final Office Action Issued in U.S. Appl. No. 14/298,658", dated Apr. 26, 2017, 17 Pages.

"Non Final Office Action Issued in U.S. Appl. No. 14/298,658", dated Sep. 26, 2017, 16 Pages.

"Non Final Office Action Issued in U.S. Appl. No. 14/298,658", dated Jun. 30, 2016, 15 Pages.

"International Preliminary Report on Patentability Issued in PCT Application No. PCT/US2015/033867", dated Sep. 8, 2016, 8 Pages.

"International Search Report and Written Opinion Issued in PCT Application No. PCT/US2015/033867", dated Oct. 2, 2015, 13 Pages.

"Second Written Opinion Issued in PCT Application No. PCT/US2015/033867", dated May 23, 2016, 7 Pages.

Yatani, et al., "SemFeel: A User Interface with Semantic Tactile Feedback for Mobile Touch-screen Devices", In Proceedings of the 22nd Annual ACM Symposium on User Interface Software and Technology, Oct. 4, 2009, pp. 111-120.

* cited by examiner

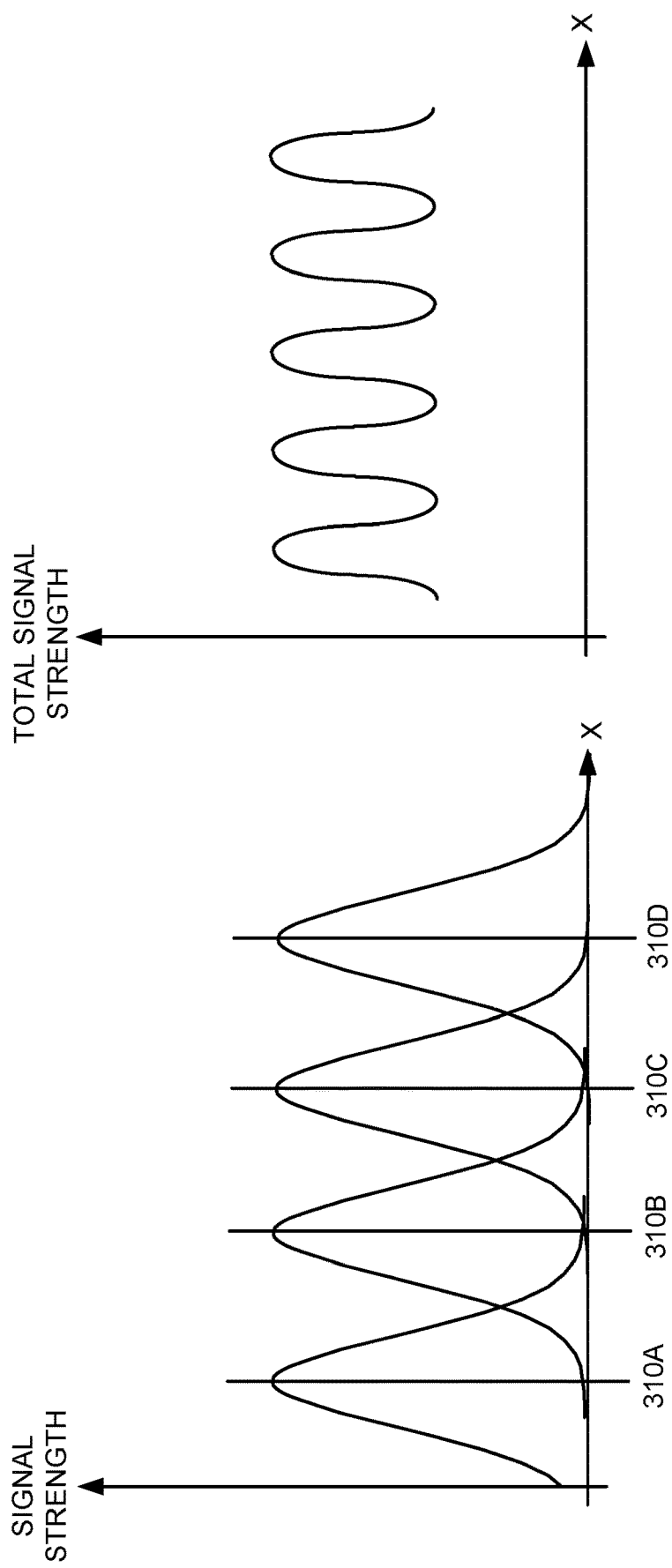

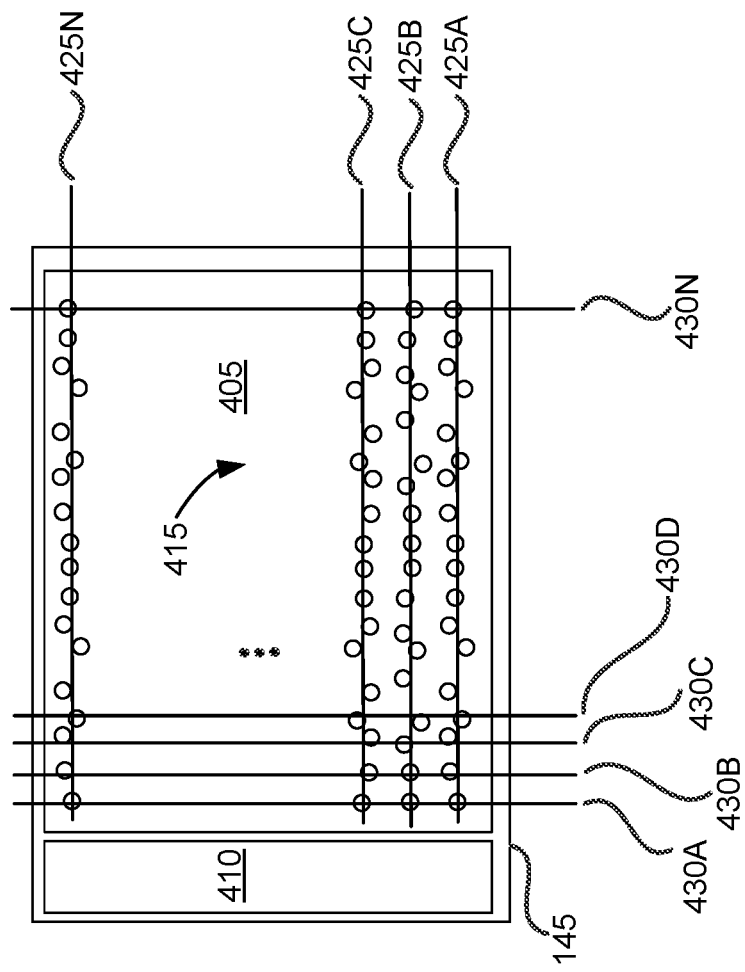

AUTONOMOUS HAPTIC STYLUS

BACKGROUND

When a person writes on paper with a pen or pencil, the fibrous nature of the paper provides a rough, non-uniform surface with some friction. In contrast, when a person uses a stylus to write on the display screen of a tablet computer, a laptop computer, electronic game, or the signature capture screen of a credit card point of sale device, the surface of the display screen, typically glass, is smooth and almost completely uniform.

Typically, the tip of the stylus is also smooth, implying a small and uniform coefficient of friction, and producing a writing experience with very little tactile feedback. Many persons find this lack of tactile feedback impairs the controllability of the stylus, resulting in a writing, signature, or drawing that is distorted with respect to the same writing, signature, or drawing done on paper.

SUMMARY

Technologies are described herein for an autonomous haptic stylus that provides tactile feedback to a person moving the stylus across a display screen of a tablet computer, laptop computer, credit card point of sale device, electronic game, or similar device allowing a person to write or draw on the display screen. Technologies are also described herein for a digitizer for a display screen to provide information usable by an autonomous haptic stylus.

An autonomous haptic stylus self-determines its velocity across a display screen and vibrates to provide tactile feedback to the person. The stylus can provide velocity-dependent vibrations, or can provide vibrations when the stylus is moving and not provide vibrations when the stylus is not moving. An autonomous haptic stylus can also self-determine its position on the display screen and provide tactile feedback when the stylus is being moved across one area of the display screen, but not provide tactile feedback when the stylus is being moved across another area of the display screen. A digitizer is also disclosed that provides information, via touch-screen sensing electrodes, that permits such an autonomous haptic stylus to determine its position on a display screen and its velocity across the display screen.

Methods are also described herein for a stylus to autonomously determine its own velocity across a display screen and provide tactile feedback based on that velocity. Methods are also described that use the stylus velocity to simulate tactile feedback corresponding to the texture of real-world materials. Methods are also described herein for a stylus to self-determine its position on the display screen and provide tactile feedback when the stylus is being moved across one area of the display screen, but not provide tactile feedback when the stylus is being moved across another area of the display screen. Methods are also described herein for a digitizer to provide information that permits an autonomous haptic stylus to determine its position on a display screen and its velocity across the display screen.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure. In addition, it is not necessary to use all techniques described herein in order to obtain any benefit or benefits described herein. Also, it is not necessary to obtain all benefits described herein in order to obtain any benefit described herein. In other words, one can choose to obtain only one benefit described, or to obtain more than one of the benefits described herein, and can choose to implement one technique or method that provides the chosen benefit(s) and to not implement other techniques or methods described herein.

BRIEF DESCRIPTION OF THE DRAWINGS

FIG. 3B illustrates the detected signal strength of individual electrodes with respect to the distance from the electrodes.

FIG. 3C illustrates an exemplary series of peaks and valleys in the total detected signal strength occurring as the stylus moves across the row electrodes or the column electrodes.

FIG. 4C illustrates an exemplary display screen having bumps irregularly spaced on the surface thereof.

DETAILED DESCRIPTION

Figure 1:
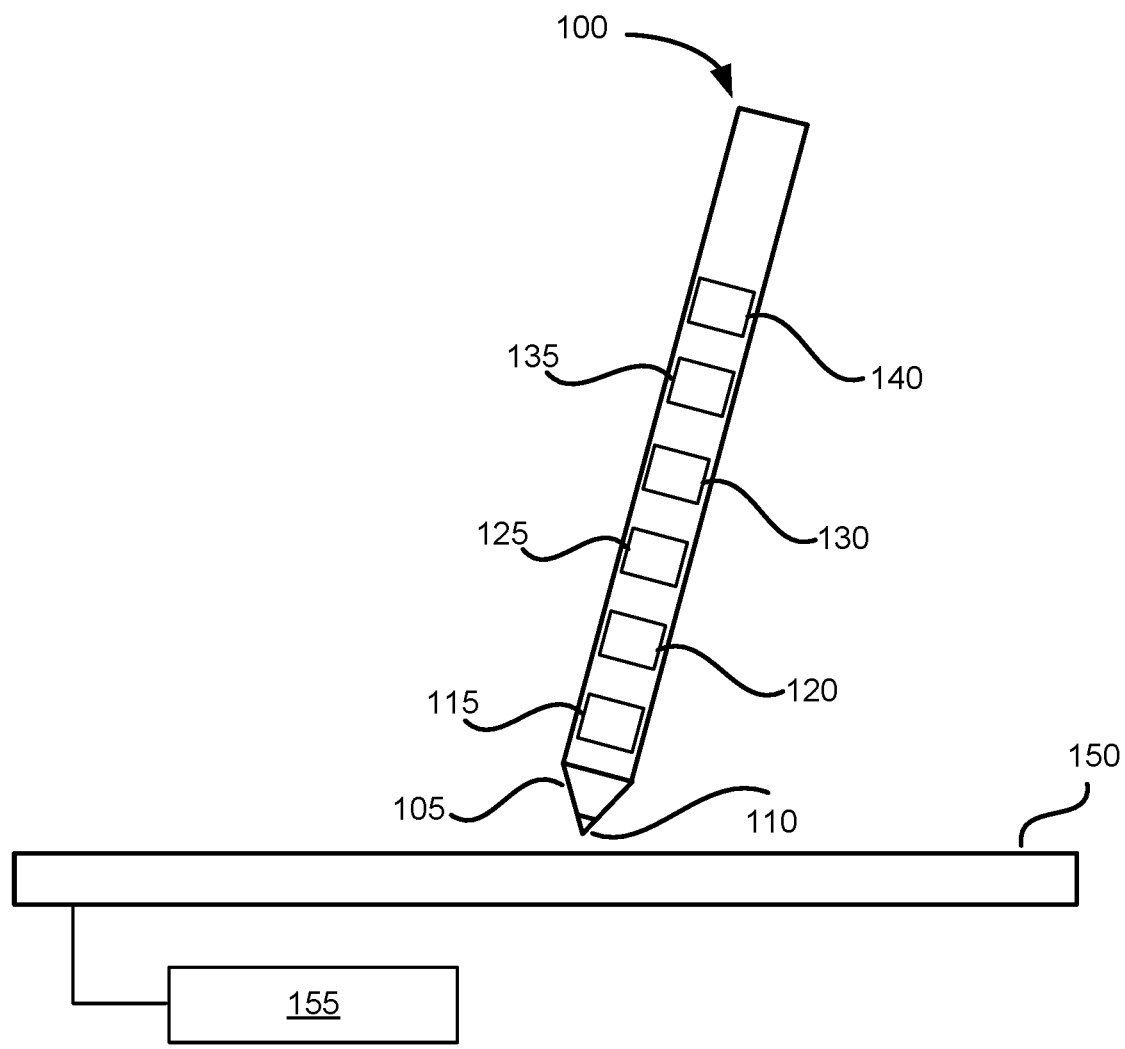
FIG. 1 is a block diagram of an exemplary autonomous haptic stylus and a display screen driven by a computer or a component therein, such as a display screen digitizer.

An autonomous haptic stylus is disclosed herein. When a person, i.e., the "user," moves the stylus across a display screen, the stylus autonomously determines, i.e., self-determines, its own velocity across the display screen and/or its position on the display screen. The stylus then produces vibrations or other physical manifestations that provide tactile feedback to the user by simulating the feel of a pen or pencil being drawn across an irregular writing surface, such as paper. This tactile feedback to the user causes the user to have a more familiar writing experience, such as of writing on paper, even though the user might actually be writing on a smooth, constant friction surface, such as the glass display screen of a tablet computer, laptop computer, credit card point of sale device, electronic game display, or other device.

Various implementations are disclosed herein. In one implementation, the stylus provides different tactile feedback for different velocities. The different tactile feedback can be different vibration statistics, different random patterns, different vibration frequencies, different vibration amplitudes, different vibration patterns, or playing a vibration pattern at different rates. In another implementation the stylus simply turns the tactile feedback on if the stylus is moving and turns the tactile feedback off if the stylus is not moving.

Further, in an implementation the stylus provides the tactile feedback regardless of where the stylus is on the display screen. In another implementation the stylus provides the tactile feedback when the stylus is moving in one area of the display screen, and does not provide tactile feedback when the stylus is moving in another area of the display screen.

In an implementation of the stylus, the stylus uses an electrostatic sensor to detect capacitively-coupled currents from signals driving row and column electrodes in the display screen. In an implementation of the display screen, a digitizer circuit that drives the touch sensitive electrodes for the display screen provides drive signals on both the row electrodes and the column electrodes of the display screen. This allows the stylus to use the detected capacitively-coupled currents to determine its velocity across the display screen.

In another implementation of the display screen, the digitizer circuit that drives the touch sensitive electrodes for the display screen provides drive signals on both the row electrodes and the column electrodes of the display screen, and the drive signals contain information that identifies each row and each column. This allows the stylus to use the detected capacitively-coupled currents to determine its position on the display screen and its velocity across the display screen.

In another implementation of the stylus, the stylus uses a force or pressure sensor to detect bumps, such as inverse dimples, in the display screen. This allows the stylus to use the rate of occurrence of the bumps and landings (valleys) between the bumps to determine its velocity across the display screen.

In another implementation of the display screen, the display screen has numerous bumps (such as inverse dimples) in some areas of the display screen, but not in other areas of the display screen. This allows the stylus to use the presence or absence of bumps to determine whether to provide or not to provide tactile feedback, and allows the stylus to use the rate of occurrence of the bumps and landings to determine its velocity across the display screen when tactile feedback is to be provided.

Self-determination of velocity and/or position by the stylus reduces latency between the time that the user starts to move the stylus across the display screen and the time that the user receives tactile feedback simulating movement of the stylus across paper. When a computer driving the display screen monitors the row and column electrodes to determine the position of the stylus on the display screen, determines the velocity of the stylus based upon changes in position of the stylus, encodes the position and/or velocity information for transmittal across an electronic communications link, such as Bluetooth, electrostatic, or infrared, and transmits the position and/or velocity information, and the stylus receives the transmission, decodes the transmission, and then begins to provide tactile feedback, the latency can be significant, impairing the usefulness of the provided feedback even to the point of distracting or irritating the average user. A low latency electronic communication link can be used, so as to reduce latency issues, but at the expense of reduced battery life.

Self-determination of velocity and/or position information eliminates encoding, decoding, and transmission times associated with such an electronic communication link and can, according to at least one implementation described herein, even eliminate a need for the electronic communication link. In addition, not using a receiver for an electronic communication link to receive velocity and/or position information from a computer reduces power drain on the battery (batteries) in the stylus, thereby conserving battery power in the stylus and allowing use of a smaller battery and/or increasing the time between replacing or recharging the battery in the stylus.

For the benefit of increasing readability by reducing the recitation and repetition of inclusive terms, the terms "may be, but is not limited to," "can be, but is not limited to," "by way of example, and not of limitation," "such as, but not limited to," "for example, and not as a limitation," and similar expressions, are abbreviated herein as "may be," "can be," "by way of example," "such as," and "for example."

Figure 2:
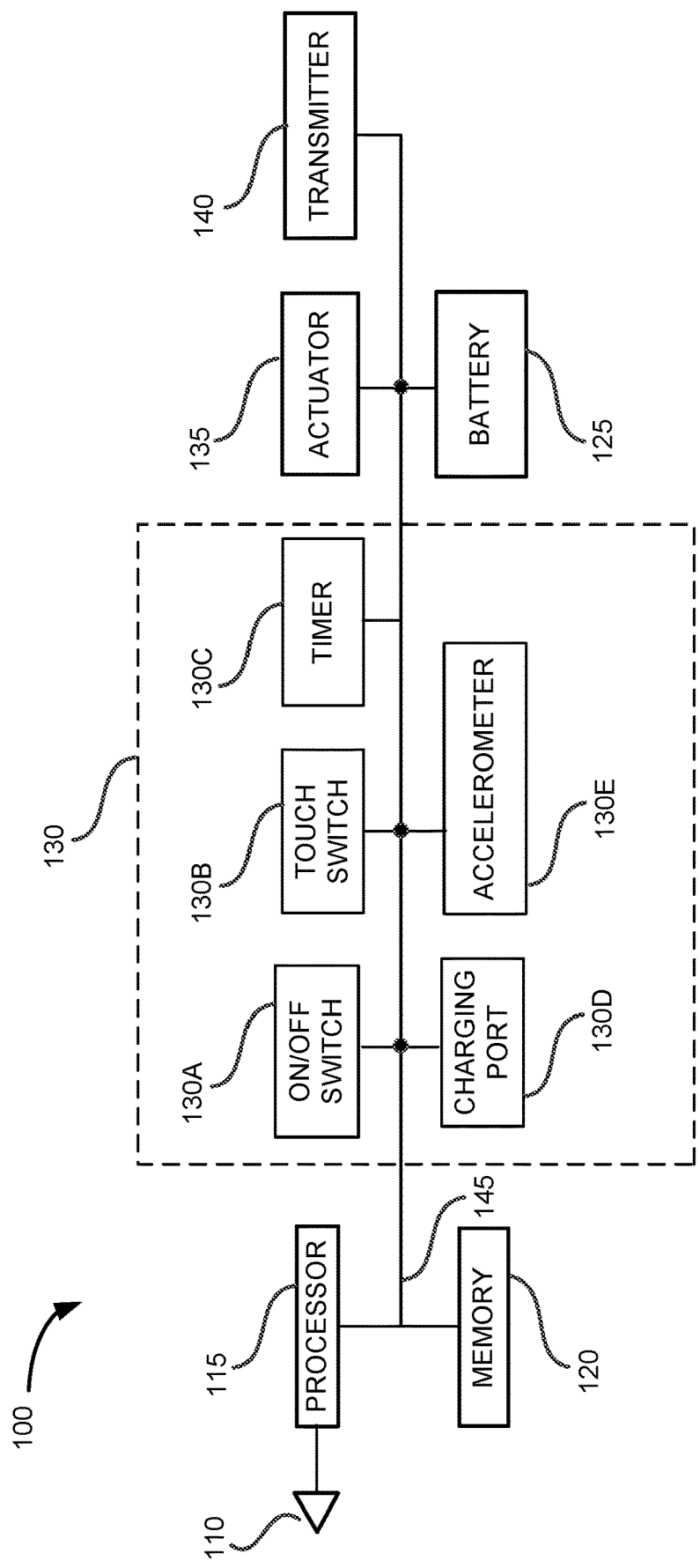
FIG. 2 is a schematic block diagram showing the various components of an exemplary stylus.
Figure 3A:
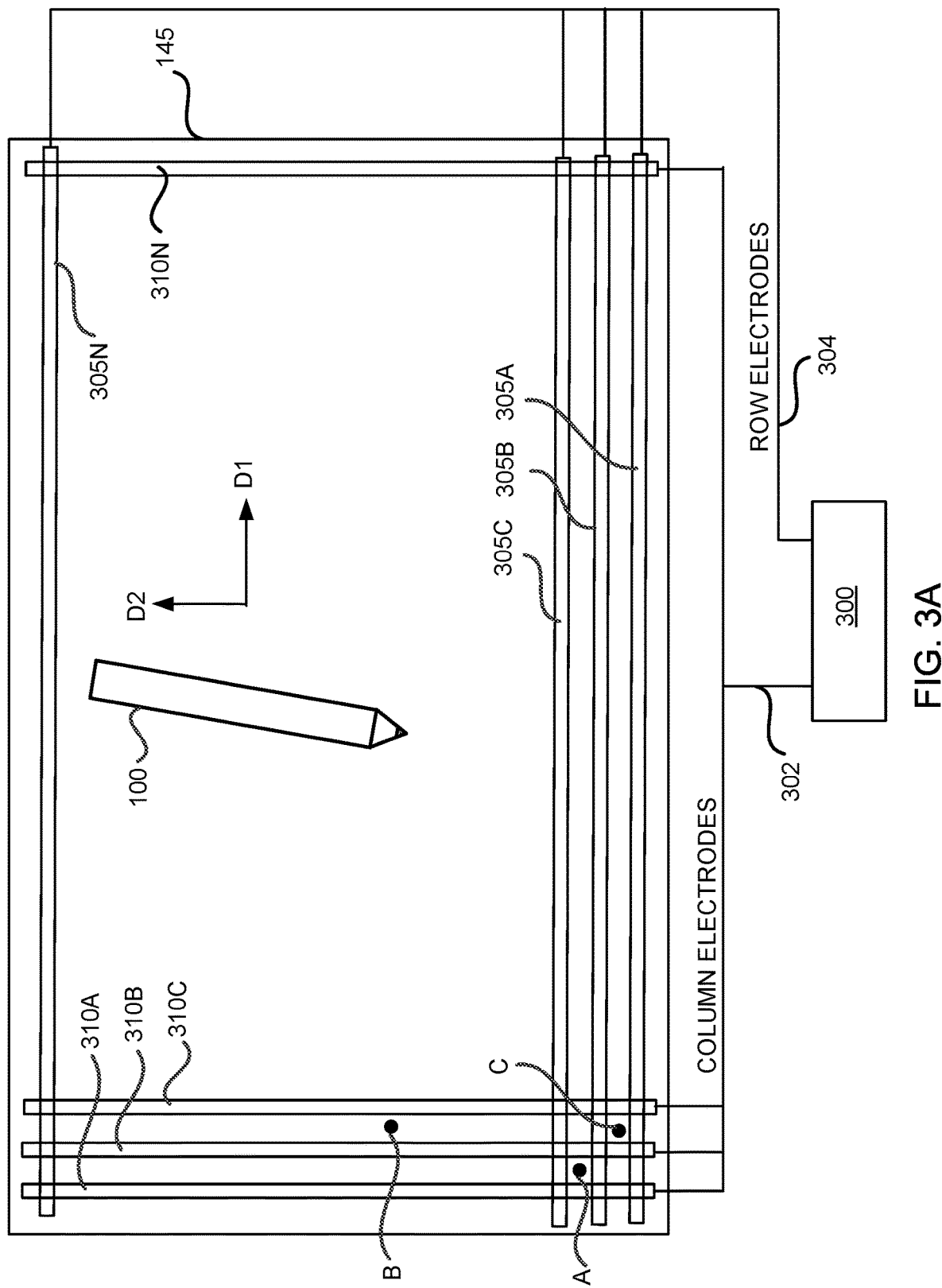
FIG. 3A illustrates a stylus used with a mutual capacitance or self-capacitance touch-sensitive display screen having row electrodes and column electrodes.

Turning now to the drawing, the various implementations mentioned above will be described. FIG. 1 is a block diagram of an exemplary autonomous haptic stylus 100 used with a display screen 150 driven by a computer 155 or a component therein, such as display screen digitizer 300 (FIG. 3A). FIG. 2 is a schematic block diagram showing the various components of the exemplary stylus 100. The stylus 100 has a tip 105 at one end, a sensor 110 in or connected to the tip 105, a processor 115, a memory 120, a battery (or batteries) 125, various other components 130, an actuator 135, an optional transmitter 140, and an exemplary plurality 145 (FIG. 2) of conductors to provide for communications and/or power among the various components. The tip 105 is at the end of the stylus 100 that is normally positioned toward and pressed against the display screen 150 when the stylus 100 is being used.

The sensor 110 can be an electrostatic voltage sensor or can be a force (pressure) sensor. As used herein with respect to the sensor 110, the term "sensor" does not include an electronic communication link to receive the velocity of the stylus 100 or the position of the stylus 100 as calculated by the computer 155 operating the display screen 150. An electrostatic sensor 110 receives capacitively-coupled currents from the row and column electrodes 305, 310 (FIG. 3A) of the display screen 150. Those signals are amplified, such as by a transimpedance amplifier, and some form of gain control can also be used. The amplified signals are then converted to digital signals for use by the processor 115. A pressure sensor 110 can be, for example, a piezoelectric crystal that provides an output voltage response to the pressure imposed upon it, such as when the stylus 100 is moved over a bump on the display screen 150. Those signals are amplified, and some form of gain control can also be present. The amplified signals are then converted to digital signals for use by the processor 115.

The processor 115 reads and processes signals from the sensor 110 to determine the velocity of the stylus 100 across the display screen 150 and/or to determine the position of the stylus 100 on the display screen 150. Based upon the velocity and/or the position, the processor 115 sends signals to the actuator 135, causing the actuator 135 to provide some form of tactile feedback, such as by vibrating in a desired manner. The actuator 135 can be, for example, a piezoelectric actuator, an electromagnetic actuator, a linear resonant actuator (LRA), an eccentric rotating mass motor (ERM), or some other type of vibrating mechanism. A piezoelectric actuator and an electromagnetic actuator are advantageous in that they generally allow both the frequency and the amplitude of vibration to be varied, and varied independently of each other. An LRA generally has a single resonant frequency, although the bandwidth around this frequency can be adjusted at design time. An ERM intrinsically relates amplitude and frequency, such that they cannot be varied independently of each other.

The memory 120 stores and provides operating instructions for the processor 115, can store and provide data defining different patterns for the haptic or tactile feedback, including data defining a random process (e.g., an autoregressive moving average (ARMA) model and an associated Gaussian noise variance), and can store and provide other information, such as drawing canvas boundary information. The battery 125 provides operating power to the processor 115 and the memory 120 and, if appropriate, to the sensor 110, the actuator 135, the components 130, and/or the optional transmitter 140.

The components 130 can include user controls, such as a manually-operated on/off switch 130A, and/or a sensor or touch-sensitive switch 130B so that the stylus 100 is automatically turned on when the user grasps the stylus 100 and automatically turned off when the user releases the stylus 100, so as to conserve battery power. The components 130 can also include a timer 130C. The timer 130C can be a separate component, can be a circuit in the processor 115, or can be implemented as part of the operations of the processor 115. The timer 130C can monitor the output of the sensor 110 for changes resulting from movement of the stylus 100 across the display screen 150, or monitor the output of the accelerometer 130E or other motion detector for changes resulting from movement of the stylus 100 by the user. The timer 130C can therefore turn off the stylus 100 when the user has not used the stylus 100 for some predetermined period of time, thereby conserving battery power. The processor 115 can be programmed to go into a sleep mode if there is no change in signals from the sensor 110, accelerometer 130E, or other motion detector, for a specified amount of time, and/or to wake up, if asleep, when there is a change in the signals from any of those components.

If it is desired to use a rechargeable battery 125 rather than to use a replaceable battery 125 then the components 130 can include a charging port 130D, which can include a recharging circuit. An accelerometer 130E can also be used, as indicated above, for power management. The accelerometer 130E can detect motion of the stylus 100, or the lack of motion thereof, and provide signals to wake up the processor 115, or allow the processor 115 to enter the sleep mode.

An optional transmitter 140 is also shown. The optional transmitter 140 can be an electrostatic transmitter, a Bluetooth transmitter, another wireless/RF transmitter, an infrared transmitter, or another electronic communication link transmitter to communicate signals from the sensor 110 and/or the stylus 100 to the computer 155, such as the tip force, torque, tilt angle, velocity and/or position information computed by the processor 115. This information can be used to relieve the computer 155 of the tasks of determining the position and velocity of the stylus 100, or for some other purpose or process, such as to provide a notice that the battery 125 reserves are low, or that the stylus 100 is about to enter the sleep mode. The optional transmitter 140 may increase the power drain on the battery 125.

The relative positions and sizes of the various components 115, 120, 125, 130, 135, and 140 shown are for convenience of illustration and are not intended to depict a required or suggested component placement or component size. Indeed, one of ordinary skill in the art can choose, for various reasons, to rearrange the locations of the various components, and the actual locations can be determined by such factors as size, heating, balance, and cost considerations, and the size of the various components can be determined by the state of the technology.

FIG. 3A illustrates a stylus 100 used with a mutual capacitance or self-capacitance touch-sensitive display screen 150 having row electrodes 305A-305N (collectively, rows 305, or individually, row 305, as the context might require) and column electrodes 310A-310N (collectively, columns 310, or individually, column 310, as the context might require), respectively. The width, length, spacing, and number of rows 305 and columns 310, as shown, is for convenience of illustration. In this type of display, the electrodes in one set of electrodes (either the rows or the columns) are often driven sequentially, and the outputs from the same electrodes or the outputs from the other set of electrodes are measured to determine where the display screen 150 is being touched.

In this implementation the sensor 110 is an electrostatic sensor that can detect the voltage when an electrode near it is being driven. For example, if the stylus 100 is at position A then the sensor 110 will detect the signals on electrodes 310A and 310B (as well as possibly detecting signals from other electrodes). If the stylus 100 is closer to electrode 310A then the intensity of the signal when electrode 310A is being driven will be higher than the intensity of the signal when electrode 310B is being driven. If the stylus 100 is closer to electrode 310B then the intensity of the signal when electrode 310B is being driven will be higher than the intensity of the signal when electrode 310A is being driven. If the stylus 100 is midway between electrodes 310A and 310B then the intensity of the signal when electrode 310A is being driven will be the same as the intensity of the signal when electrode 310B is being driven.

If the stylus 100 is stationary, then the relative signal strengths (intensities) from electrodes 310A and 310B will stay constant. If, however, the stylus 100 begins to move, say in the direction indicated by the arrow D1, the intensity of the signal from the column electrode 310A will begin to decrease while the signal from the column electrode 310B will increase. Then, the signal from the column electrode 310B will begin to decrease while the signal from the column electrode 310C will increase, and so on. This information can be used to determine the direction of movement of the stylus 100 and the velocity of the stylus 100.

FIG. 3B illustrates the detected signal strength of individual electrodes with respect to distance from the electrodes. For example, the detected signal strength for a signal on column electrode 310A begins at a low value if the stylus 100 is near the left edge of the screen and then, as the stylus 100 is moved to the right along the X-axis, begins to rise, peaks as the stylus 100 passes over the column electrode 310A, and then falls off as the stylus 100 continues moving to the right. Similarly, the detected signal strength for a signal on column electrode 310B begins at a low value if the stylus 100 is near the left edge of the screen and then, as the stylus 100 is moved to the right along the X-axis, begins to rise, peaks as the stylus 100 passes over the column electrode 310B, and then falls off as the stylus 100 continues moving to the right. The strength the signal from individual row electrodes 305A-305N also varies in this manner.

This signal strength information can be used to determine the velocity of the stylus 100. The signal strength from each electrode 305A, 305B, 310A, 310B, etc., is measured by the stylus 100. The signal from one electrode 305, 310 can be distinguished from the signal from another electrode 305, 310 by assigning each electrode 305, 310 a characteristic which distinguishes that signal from signals from other electrodes. Time, frequency, and/or code multiplexing, address information, a combination thereof, and/or other techniques can be used to permit identification of the electrode from which a signal originates.

In this implementation, the stylus 100 measures the individual signal strengths of the signals it receives from the various nearby electrodes 305, 310. Based on relative values of the individual signal strengths, the stylus 100 determines its position with respect to those electrodes by, for example, interpolation. For example, the stylus 100 may determine that it is halfway between row electrodes 305B and 305C (the signal strengths from these two electrodes are approximately equal and are larger than the signal strengths from other electrodes), or it may determine that it is closer to row electrode 305B than to row electrode 305C (e.g., the signal from row electrode 305B is twice as strong as the signal from row electrode 305C). Then, a short time later, the stylus 100 will take measurements again. If the two signal strengths are still approximately the same, then the stylus 100 determines that it has not moved, so its velocity is zero. If, however, the strength of the signal from row electrode 305C is now twice as strong as the signal from row electrode 305B, and these are still the strongest signals, then the stylus 100 is still between row electrodes 305B and 305C, but closer to electrode 305C. If the stylus 100 first determined, for example, that it was approximately mid-way between the two row electrodes 305B and 305C, and now determines that it is, for example, three-fourths of the way from row electrode 305B toward row electrode 305C, the stylus 100 now knows that it has moved one-fourth of the distance between these row electrodes. The separation between these row electrodes is known, so the distance traveled ($\Delta y$) is now known. Also, the frequency of measurement of the signal strengths is known, so the time difference ($\Delta t$) is also known. The vertical velocity of the stylus 100 is therefore $\Delta y/\Delta t$.

Similarly, the horizontal velocity of the stylus 100 is determined by measuring and comparing signal strengths from the column electrodes 310. The scalar velocity is then the square root of the sum of the square of the horizontal velocity and the square of the vertical velocity.

FIG. 3C illustrates an exemplary series of peaks and valleys in the total detected signal strength or intensity occurring as the stylus 100 moves across the row electrodes 305 or the column electrodes 310. This total detected signal strength can be interpreted as a measure of received power, without an attempt to separate the contribution of each transmitting electrode. In one implementation, the peaks correspond with the stylus being centered on top of a transmit electrode, and the valleys correspond to the stylus being in between electrodes. The more rapidly these peaks and valleys occur, the more rapidly the stylus 100 is being moved across the electrodes 305, 310, for example, along direction D1. Thus, the processor 115 can use information about the timing between peaks (or between valleys, or between a peak and a valley) to determine the velocity of the stylus 100.

In a typical mutual capacitance touch-sensitive display screen 150 a display screen digitizer 300 (part of computer 155) drives one set of electrodes as the transmitter electrodes (either the row electrodes 305 via control lines 304 or the column electrodes 310 via control lines 302), and the voltage is monitored at the other set of electrodes (the receiver electrodes). In this situation, if the stylus 100 is being moved in the direction D2, the relative intensities of the signal from column electrode 310A and the signal from the column electrode 310B will not change.

In one implementation, the display screen digitizer 300 alternates the set of electrodes that is being used for the transmitter electrodes and the set of electrodes that is being used for the receiver electrodes. That is, the display screen digitizer 300 drives the column electrodes 310 and monitors the outputs on the row electrodes 305, then the display screen digitizer 300 drives the row electrodes 305 and monitors the outputs on the column electrodes 310, etc. Thus, if the stylus 100 is being moved in the direction D1 it will cross the driven column electrodes 310, thus also resulting in peaks and valleys as in FIG. 3C. If the stylus 100 is being moved in the direction D2 it will cross the driven row electrodes 305, thus again resulting in the peaks and valleys of FIG. 3C. Thus, the stylus 100 is able to detect the grid pattern in the display screen 150, and the processor 115 is able to generate timing information and determine the velocity of the stylus 100. The timing information can be, for example, the time between peaks, such as adjacent peaks, the time between valleys, such as adjacent valleys, the time between a peak and a subsequent valley, or the time between a valley and a subsequent peak.

In a typical self-capacitance touch-sensitive display screen 150 the capacitance between each electrode and circuit ground is measured. The display screen digitizer 300 (part of computer 155) drives an electrode (either a row electrode 305 via control lines 304 or a column electrode 310 via control lines 302), and either monitors the voltage on that same electrode or at an auxiliary circuit designed to transfer and measure the charge stored on the electrode. Touching the screen changes the capacitance between the nearby electrode(s) and ground, which changes the measured voltage. In this situation, if the stylus 100 is being moved in direction D1 it can sense the change in signal strength of the column electrodes 310A, 310B and 310C, because these electrodes acts as transmitters during self-capacitance measurement cycles. Similarly, if the stylus is being moved in direction D2 it can sense the change in signal strength of the row electrodes 305A, 305B and 305C, because these electrodes also act as transmitters during self-capacitance measurement cycles.

If the stylus 100 is being moved from point A to point B, that is, movement is along both direction D1 and direction D2, then the processor 115 can use this information to determine the net scalar velocity, if desired, such as by determining the speed along direction D1, the speed along direction D2, and adding them as vectors, averaging them, adding them proportionately based upon relative speeds, or using some other technique. For example, if the speed along direction D1 is S1, and the speed along direction D2 is 0, then the resultant velocity would be S1. Similarly, if the speed along direction D1 is 0, and the speed along direction D2 is S1, then the resultant velocity would again be S1. If, however, if the speed along direction D1 is S1, and the speed along direction D2 is also S1, then the resultant velocity would be, for example, S1*SQRT(2).

In another implementation of the display screen 150 of FIG. 3A, the display screen digitizer 300 is programmed to add column and row identification information to the signals driving the column electrodes 310 and the row electrodes 305. This information can be detected by an electrostatic sensor 110 and provided to the processor 115, which can use this information to determine the position of the stylus 100 on the display screen 150. For example, if the sensor 110 receives identification information identifying column 310B and then receives identification information identifying column 310C, then the processor 115 knows that the stylus 100 is between columns 310B and 310C. If the sensor 110 also receives identification information identifying row 305A and then receives identification information identifying row 305B, then the processor 115 knows that the stylus 100 is also between rows 305A and 305B. Hence, the stylus 100 is at point C. This position information can be used, for example, to determine whether or not to apply a signal to cause the actuator 135 to provide tactile feedback.

If the processor 115 determines that the stylus 100 is between two rows or two columns then the position of the stylus 100 can be determined more precisely. For example, if the processor 115 has determined that the stylus 100 is between rows 305B and 305C, such as by using the row identification information described above, the processor 115 can measure the intensity of the signal identified as row 305B and the intensity of the signal identified as row 305C and interpolate them to better determine the position of the stylus 100 relative to rows 305B and 305C. This interpolation can be a linear function, or can be a non-linear function modeled from calibration measurements. The processor 115 may also use the signal strength of more than the two closest electrodes (for example, it may use the signal strength of the four or five closest electrodes).

Further, if the processor 115 knows the position of the stylus 100 on the display screen 150 at a first time, and then knows the position on the display screen 150 at a second time, the processor 115 can determine the distance between those positions and, also knowing the difference between the first time and the second time, determine the velocity of the stylus 100 across the display screen 150.

The columns and rows can be identified by using any technique that allows the signals driving them to be distinguished. For example, electrode drive signals may be assigned which have different frequencies, duty cycles, phases, or numbers of pulses, or they may be convolved with different codes. Techniques for time, frequency and code division multiplexing or a combination thereof can also be used.

If the processor 115 is able to determine position information, such as by any of the techniques described above, then the processor 115 can use this position information to determine the velocity of the stylus 100 across the display screen 150. For example, if a first position is known, whether absolute or relative, and a second position is similarly known, and the time to travel between those two positions is known, then the velocity of the stylus 100 is readily determined by the processor 115.

Preferably, the processor 115 obtains and processes information from the sensor 110 at a frequency such that the user begins to receive tactile feedback within a very short time after the user begins moving the stylus 100. Although "a very short time" is somewhat user-dependent, the delay is preferably less than the just-noticeable difference (JND) for latency discrimination of a touch stimulus by trained users, including cases when the touch stimulus coincides or temporally correlates with a visual stimulus. In one implementation a delay of less than 10 milliseconds is preferred.

It is useful for the stylus 100 to able to autonomously determine its position on the display screen 150. For example, it might be desirable to provide tactile feedback when the stylus 100 is moving over a part of the display screen 150 that is depicting a writing or drawing area within the display screen 150, but not to provide such feedback when the stylus 100 is moving over some other part of the display screen 150. For example, if a drawing canvas is being illustrated on the display screen 150 by a drawing program, then feedback would be appropriate when the stylus 100 is moving over the drawing canvas, but not when the stylus 100 is outside of the drawing canvas. As another example, if a notepad for writing notes is being illustrated on the display screen 150 by a writing program, then feedback would be appropriate when the stylus 100 is moving over the notepad, but not when the stylus 100 is outside of the notepad. The area outside of the writing or drawing area can be used for other purposes if desired, such as to provide for clicking or tapping on different control icons by the user.

To provide for autonomous determination of position, one or more of the driving signals on the electrodes 305, 310 has information that specifies the row and column boundaries of the area which is designated for writing or drawing. These signals can be detected by an electrostatic sensor 110 and the processor 115 can extract this information from those signals. For example, if the stylus 100 is within those boundaries then tactile feedback can be provided, but if the stylus 100 is outside of those boundaries then tactile feedback is preferably not provided. The information specifying the row and column boundaries does not change rapidly so communicating it to the stylus over a high latency channel, such as an electrostatic channel, is not a problem.

In another implementation, the driving signals on the electrodes 305, 310 can have information that specifies whether each row and each column is inside the area designated for drawing. For example, the information can comprise a series of bits, with one of the bits being designated for this purpose. If the stylus 100 is on both a row and a column that are inside the designated area then tactile feedback can be provided. If, however, the stylus 100 is on either a row that is not inside the designated area, a column that is not inside the designated area, or both, then tactile feedback is preferably not provided. The information specifying whether a row or column is inside a designated area does not change rapidly so the data transfer rate using a high latency channel, such as an electrostatic channel, is not a problem.

In another implementation, the stylus 100 can have both an electrostatic sensor 110 and a force sensor 110. In this implementation, even if the stylus 100 is close enough to the display screen 150 for the electrostatic sensor 110 to detect signals from the row and/or column electrodes 305, 310, the processor 115 will not cause the actuator 135 to provide tactile feedback unless the force sensor 110 also registers a force that indicates that the stylus 100 is in contact with the display screen 150.

Figure 4B:
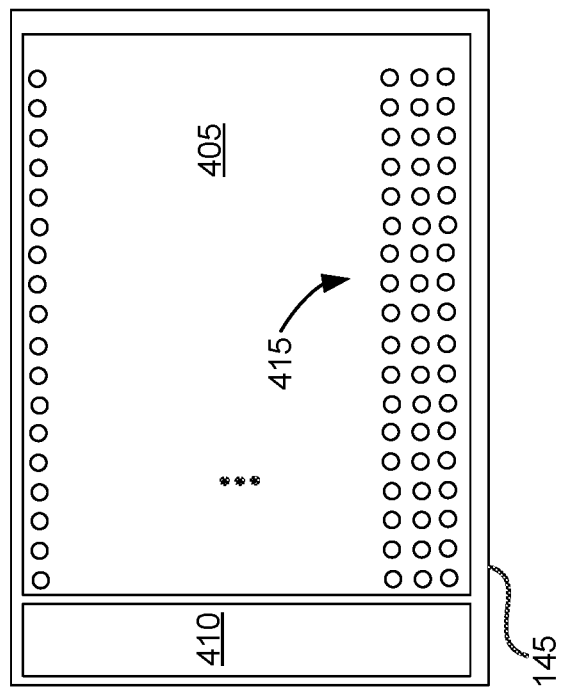
FIGS. 4A and 4B illustrate an exemplary autonomous haptic stylus and an exemplary display screen having a series of uniformly sized and spaced bumps on the surface thereof.
Figure 4A:
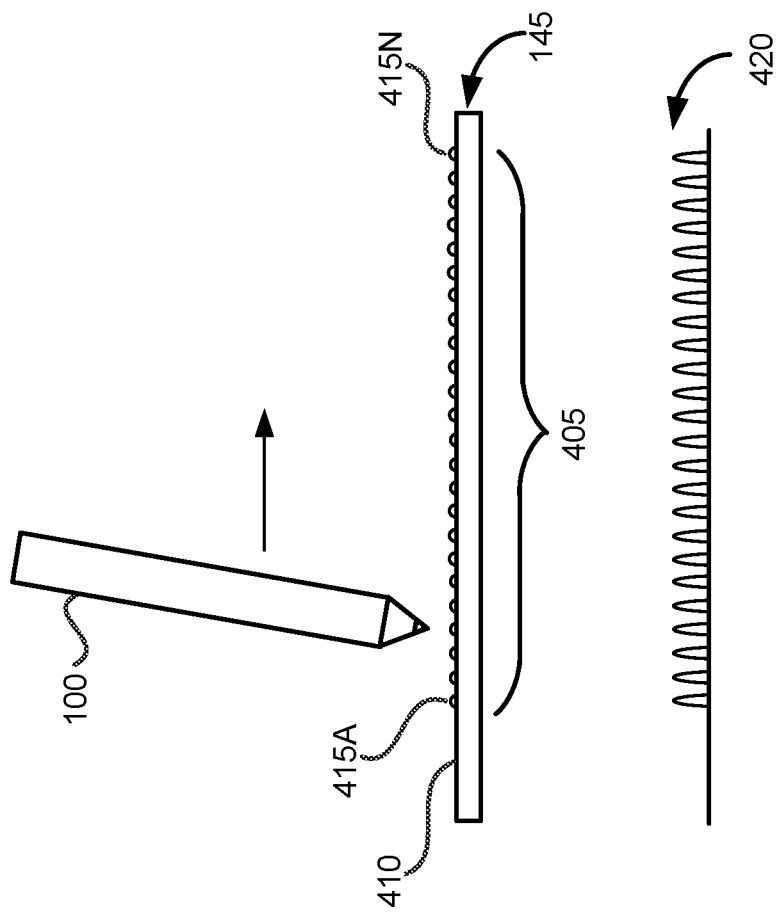

FIGS. 4A and 4B illustrate an exemplary autonomous haptic stylus 100 and an exemplary display screen 150 having a series of uniformly sized and spaced bumps 415A-415N (individually, a bump 415 or, collectively, bumps 415, as the context might require) on the surface thereof. The display screen 150 can be conventional in nature, with the benefits described herein being provided by the addition of the bumps 415 on the display screen 150. In one implementation, the entire display screen 150 has the bumps 415. The bumps 415 should be large enough to provide for reliable detection, but not so large that they impair optical quality, provide a surface that is detectable and/or unpleasant to the user, or add too much noise to the output of the sensor 110. In one exemplary implementation, a bump 415 has a height of 1 μm (micrometer) and a width of 1 mm (millimeter), and the center-to-center separation between adjacent bumps along a row or a column is preferably in the range of 1 to 4 mm. These bumps can be made using any convenient and appropriate method, such as printing directly on the glass substrate using screen printing, gravure printing, or other technique. Some techniques require specific forms of curing, such as exposure to heat or UV light.

As the stylus 100 is drawn across the display screen 150 the sensor 110 (a pressure or force sensor in this example) will output a series of pulses 420. As the width of the bumps 415 is known, and the distance between the bumps 415 is known, the duration of a pulse 420 and/or the time between pulses 420 can be used to determine the velocity of the stylus 100 across the display screen 150. For example, if the size of a bump 415 is M microns (or some other desired unit of measure of length), and the width of a pulse 420 is W microseconds (or some other desired unit of measure of time), then the speed at which the stylus 100 is moving over the bump 415 is M/W. This information can be used by the processor 115 to simply turn the actuator 135 on or off, or can be used by the processor 115 to vary the tactile feedback, for example, as a function of velocity.

For example, as the velocity of the stylus 100 increases, the processor 115 can cause the actuator 135 to more quickly sequence through a vibration pattern to provide vibrations of increasing frequency and/or increasing amplitude, implement the random process at a more rapid rate, or switch to a different random process, or some other desired indication of a change in the velocity. Conversely, as the velocity of the stylus 100 decreases, the processor 115 can cause the actuator 135 to more slowly sequence through a vibration pattern, provide vibrations of decreasing frequency and/or decreasing amplitude, implement the random process at a slower rate, or switch to a different random process, or some other desired indication of a change in the velocity.

The rectangular grid pattern of FIG. 4B implies that, for a fixed velocity, the time between bumps for a diagonal (45 degree) displacement is SQRT(2) times higher than for horizontal or vertical displacements. This implies that only utilizing the time between pulses produces a velocity estimation error which is dependent on the angle at which the stylus 100 crosses the display screen 150. This error can be avoided by jointly estimating velocity and the angle of the trajectory, for example by analyzing the time it takes to traverse a bump and/or analyzing the force sensor output while a bump is traversed, and comparing this to the interval between bumps. Alternatively, this error can be mitigated by using patterns with hexagonal, random or pseudorandom regularity.

As mentioned, it is useful for the stylus 100 to be able to autonomously determine its position on the display screen 150, at least to some extent. For example, it might be desirable to provide tactile feedback when the stylus 100 is moving over a part of the display screen 150 that is depicting a page for writing or drawing, but not to provide such feedback when the stylus 100 is moving over some other part of the display screen 150. Thus, in another implementation, the display screen 150 can have one area 405 that has bumps 415 and one or more other areas 410 that do not have bumps 415. This can be used to identify an area 405 on the display screen 150 in which the user can write information and/or draw and an area 410 on the display screen 150 in which the user might not, or is not expected to, write information or draw. For example, if the display screen 150 is depicting a page of a notebook on which the user can write information, then that area 405 would have bumps 415. Conversely, the area outside of the depicted page, such as an area 410 for clicking or tapping on different control icons, would not have the bumps 415. The processor 115 can use the presence or absence of the pulses 420 to identify whether the stylus 100 is in the writing area 405, in which case tactile feedback is provided, or the stylus 100 is in the other area 410, in which tactile feedback is not provided, or a different type of tactile feedback is provided, such as a single vibration pulse.

FIG. 4C illustrates an exemplary display screen 150 having bumps irregularly spaced on the surface thereof. In a typical display screen 150, the pixels making up the display screen 150 are arranged in uniformly spaced rows and uniformly spaced columns. Each of the bumps 415 refracts light, acting as a small lens. For a fixed width, the angle of refraction increases with the height of the bump. If the bumps 415 are in a regular, rectangular pattern which overlays the rows and/or columns of the pixels then moire aliasing can occur, which can be distracting to the user. Thus, it might be desirable to vary the implementations discussed above by the bumps 415 being in an irregular pattern, the bumps 415 being in a random or pseudo-random pattern, the bumps 415 being different sizes, and/or the bumps 415 in a row 425A-425N or column 430A-430N being randomly located above or below the centerline of that row and/or being randomly located to the left or right of that column.

The above approaches to reduce or prevent aliasing can somewhat affect the accuracy of the velocity determination but that is generally of no consequence as the tactile difference would be imperceptible to the user, especially if the actuator 135 is merely operated in an on or off condition.

Figure 5A:
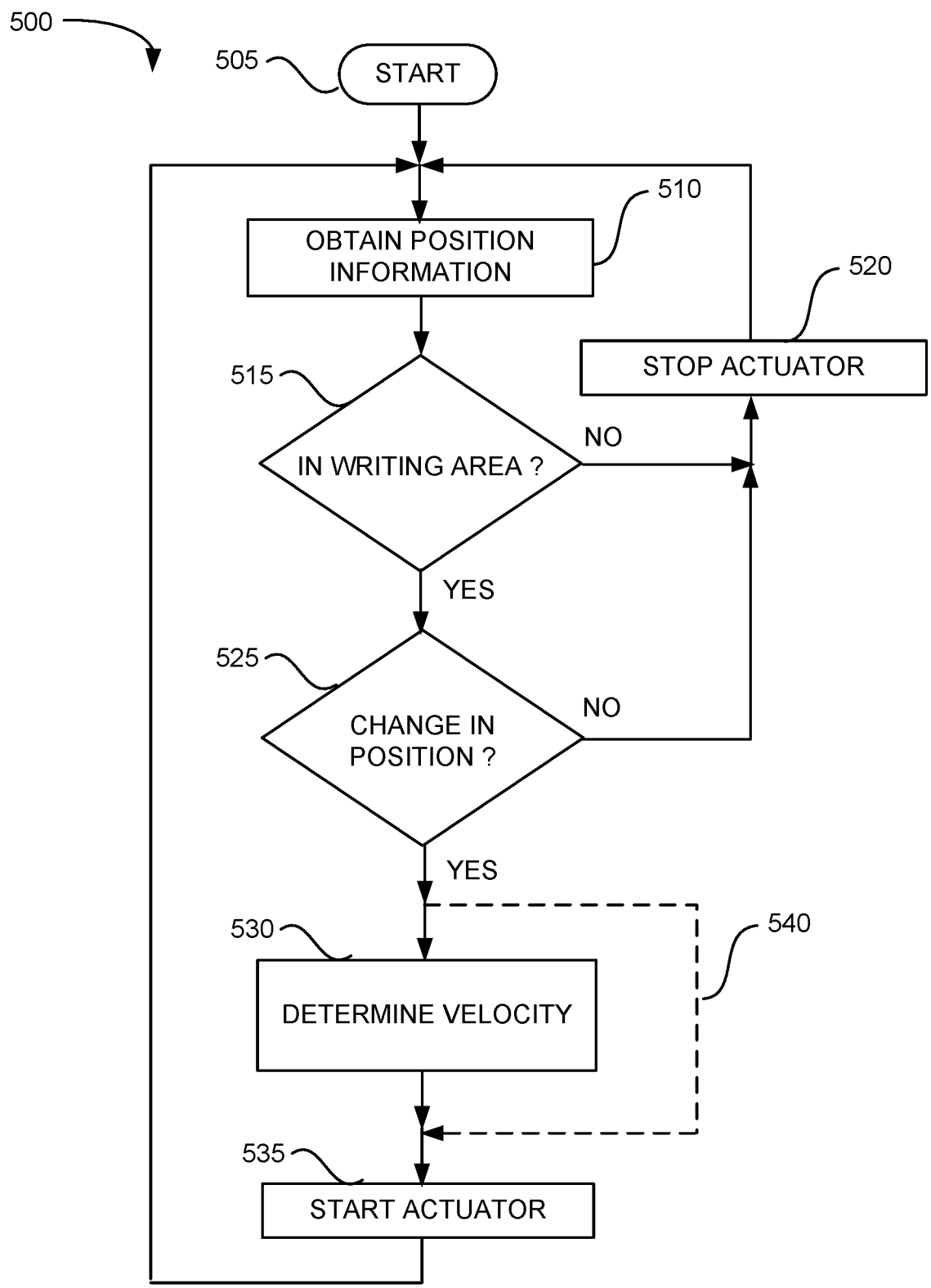
FIG. 5A is a flow diagram showing a routine that illustrates aspects of a process for controlling the actuator in the stylus if position information is available and is to be used.

FIG. 5A is a flow diagram showing a routine 500 that illustrates aspects of a process for controlling the actuator 135 in the stylus 100 if position information is available and is to be used. Position information might not be available, or might not be used, because the processor 115 has not been programmed to use this type of information, or because the display screen 150 does not provide information that can be used to determine position. The various operations herein are performed by the processor 115 unless otherwise stated or the context requires.

Upon starting 505, the processor 115 obtains position information. Position information can be obtained by the stylus 100 being placed on or moved across the display screen 150 so that the sensor 110 provides information related to position using any of the techniques described herein for obtaining position information. For example, the stylus 100 might have been moved from the smooth portion 410 of the display screen 150 to the portion 405 with the bumps 415. Or, the stylus 100 might have been placed on the display screen 150 so that the sensor 110 is electrostatically detecting row and/or column information on the display screen 150.

Processor 115 determines 515 whether the stylus 100 is in the writing/drawing area, that is, in the area where tactile feedback should be provided. If the stylus 100 is not in the writing/drawing area, the actuator 135 is stopped 520 (if it was previously actuated and is still currently actuated). The processor 115 then proceeds to operation 510 to obtain updated position information.

If the stylus 100 is in the writing/drawing area, the processor 115 then determines 525, based upon the position information, whether there has been a change in position, such as by comparing the current position to a previous position. If there has not been a change in position then the stylus 100 is considered to be stationary so the actuator 135 is stopped 520 (if it was previously actuated and is still currently actuated). The processor 115 then proceeds to operation 510 to obtain updated position information.

If there has been a change in position the processor 115 determines 530 the velocity of the stylus 100. The velocity can be determined by any of the techniques described herein. Once the velocity has been determined, the processor 115 starts 535 the actuator 135 (or continues activation if the actuator 135 was previously activated), and can modulate the frequency, amplitude, spectrum and/or time-domain pattern of actuation, based upon the computed velocity.

In an alternative implementation, operation 530 is skipped, as indicated by the dashed line 540 around it. In this alternative implementation the processor 115 simply turns on the actuator 135, but does not modulate the actuator frequency, amplitude, spectrum or time-domain pattern based upon the computed velocity. Once the processor 115 has started 535 the actuator 135, the processor 115 proceeds to operation 510 to obtain updated position information.

Figure 5B:
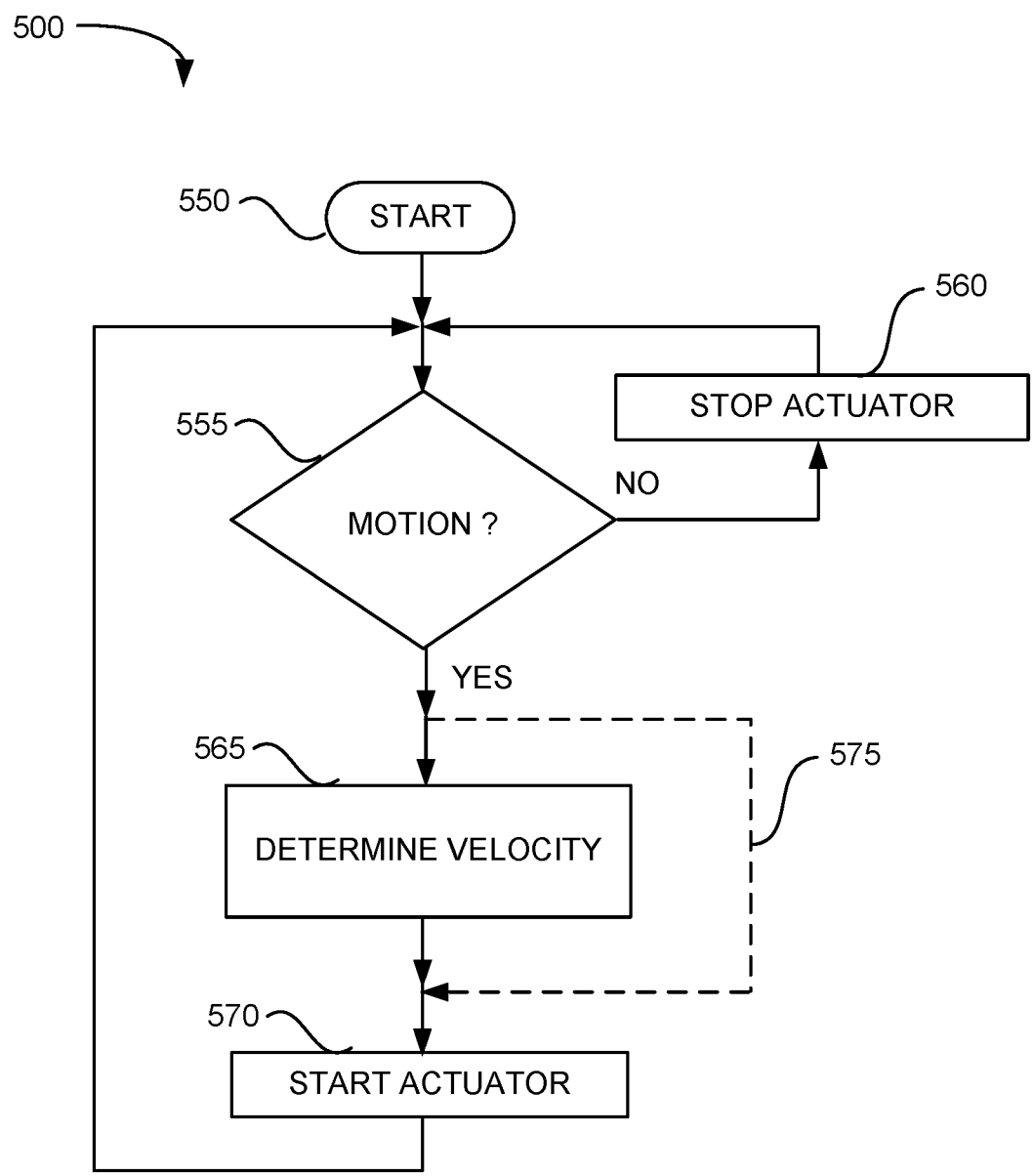
FIG. 5B is a flow diagram showing a routine that illustrates aspects of a process for controlling the actuator in the stylus if position information is not available or is not to be used.

FIG. 5B is a flow diagram showing a routine 500 that illustrates aspects of a process for controlling the actuator 135 in the stylus 100 if position information is not available or is not to be used. The various operations herein are also performed by the processor 115 unless otherwise stated or the context requires.

Upon starting 550 the processor 115 determines whether there is motion by monitoring 555 the output of one or more sensors or devices. For example, motion can be detected by a change in the output of the sensor 110 or the accelerometer 130E. If motion is not detected then the stylus 100 is considered to be stationary so the actuator 135 is stopped 560 (if it was previously actuated and is still currently actuated). The processor 115 then resumes monitoring 555 for motion.

If motion has been detected, the processor 115 determines 565 the velocity of the stylus 100. The velocity can be determined by any of the techniques described herein. Once the velocity has been determined, the processor 115 starts 570 the actuator 135 (or continues activation if the actuator 135 was previously activated), and can modulate the frequency, amplitude, spectrum and/or time-domain pattern of actuation, based upon the computed velocity.

In an alternative implementation, operation 565 is skipped, as indicated by the dashed line 575 around it. In this alternative implementation the processor 115 simply turns on the actuator 135, but does not modulate the actuator frequency, amplitude, spectrum or time-domain pattern based upon the computed velocity. Once the processor 115 has started 570 the actuator 135, the processor 115 resumes monitoring 555 for motion.

Not shown in FIGS. 5A and 5B is the effect of inactivity. If there has not been a change in position detected 525 for some predetermined time, or if the determined 530, 565 velocity has not been greater than zero for some predetermined time, the processor 115 will be placed in sleep mode to conserve battery power, and then awakened upon a subsequent notice of a change in the output of the sensor 110, the accelerometer 130E, or one of the controls 130A, 130B.

With respect to starting (535, 570) the actuator 135, in one implementation the processor 115 can simply turn the actuator 135 on or off. Drawing a line across bond-grade paper, however, will give a different sensation than drawing a line across a newspaper or drawing a line across notepad paper. Therefore, in another implementation, the memory 120 contains data defining one or more patterns for tactile feedback. For example, the frequency, amplitude, spectrum and time-domain force or acceleration waveforms can be recorded as a pencil is being drawn across different surfaces, and the information stored as different patterns in the memory 120. Or, that information can be used to generate statistical information for each surface, and that statistical information stored in the memory 120 for use in generating different patterns. Then, when the user is drawing a line or writing on the display screen 150, the processor 115 can recall a pattern from the memory 120 and drive the actuator 135 in accordance with that pattern so as to more closely simulate the experience of actually writing on a paper surface.

In one implementation the user can operate a user control, such as the switches 130A, 130B, or another switch, to select a desired pattern of tactile feedback. In another implementation, the computer 155 can identify the pattern to be used based upon the application being used, and communicate the pattern, or the type of paper or surface, to the processor 115. The computer 155 can cause the modulator 300 to place this information on one or more row or column electrodes 305, 310 at one or more times, and the electrostatic sensor 110 will detect this information and provide it to the processor 115.

The pattern used may be similar to noise because paper has a random texture. Therefore, a pattern can be simulated by a random distribution with a different frequency spectrum and/or amplitude distribution for each simulated material. In one implementation this pattern is a pseudo-random pattern. Thus, each time the pattern is played back it has a different sequence, different frequencies and/or different amplitudes, but still has substantially the same statistics.

Velocity can be simulated by adjusting the statistics of the random distribution. For example, the frequency spectrum (the power spectral density) of the synthesized signal can be adjusted as a function of velocity. This adjustment can be made to match the statistics measured for real materials.

Figure 6:
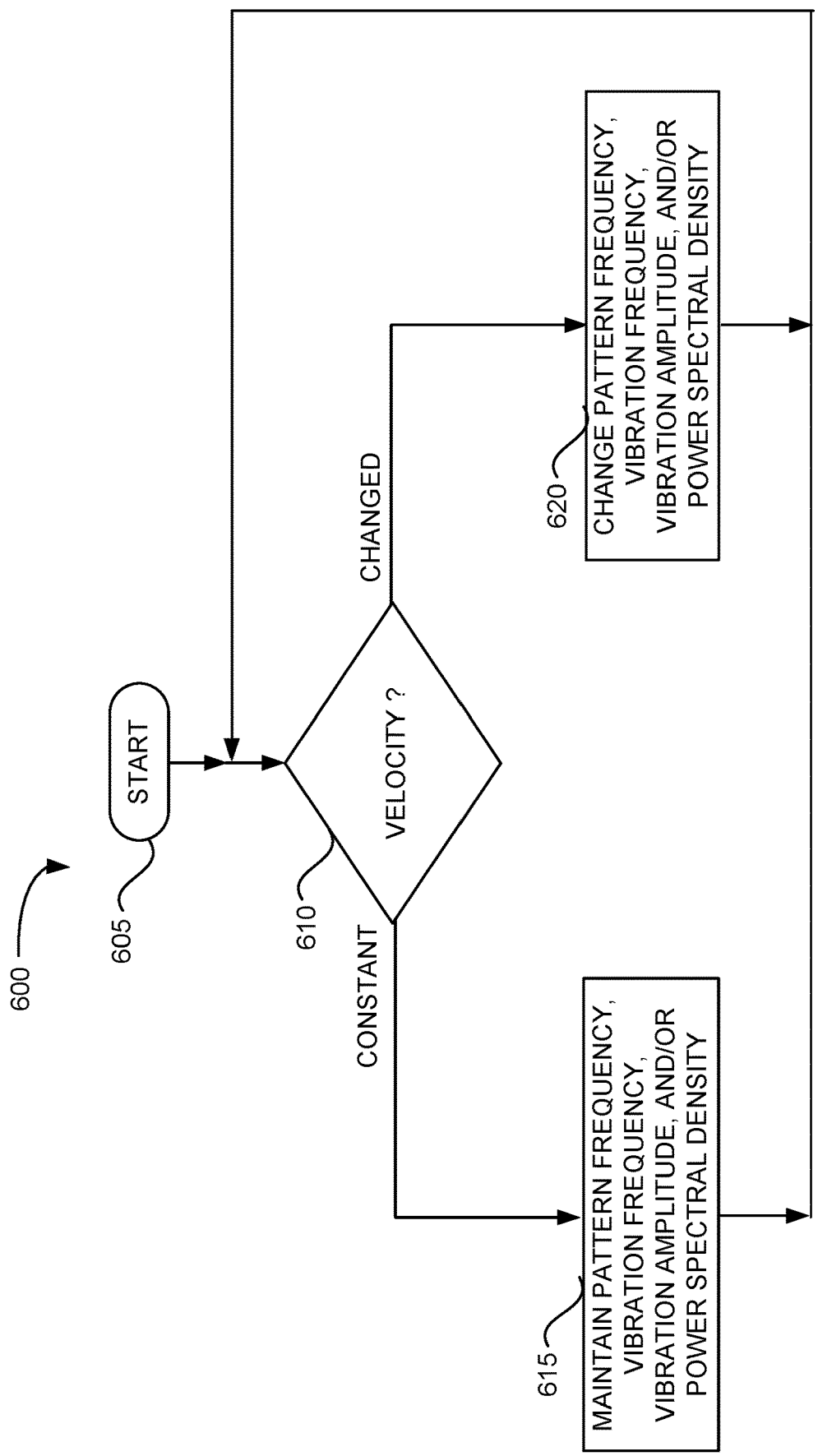
FIG. 6 is a flow diagram showing a routine that illustrates aspects of a process for modulating the activity of the actuator in the stylus.

FIG. 6 is a flow diagram showing a routine 600 that illustrates aspects of a process for modulating the activity of the actuator 135 in the stylus 100, according to one implementation disclosed herein. It should be appreciated that the logical operations described herein with regard to FIGS. 5A, 5B, and 6 and other FIGS. can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein. The various operations herein are performed by the processor 115 unless otherwise stated or the context requires.

Upon starting 605, the processor 115 monitors 610 the velocity of the stylus 100 to determine whether the velocity of the stylus 100 is changing. If the velocity is substantially constant, the processor 115 maintains 615 the pattern frequency, vibration frequency, vibration amplitude, and/or power spectral density of the signal provided to the actuator 135. If the velocity is changing, the processor 115 changes 620 the frequency of repetition of the pattern, vibration frequency, vibration amplitude, and/or power spectral density of the signal provided to the actuator 135. The processor 115 then continues to periodically monitor 610 the velocity until the stylus 100 becomes stationary or is turned off The processor 115 can change the pattern and vibration frequency spectrum (including the vibration frequency, and/or the vibration amplitude) as desired and as permitted by the particular actuator 135 used. For example, some actuators 135 only provide for an on condition or an off condition. Other actuators 135 can, within limits, be voltage and/or current sensitive with respect to the frequency of vibration and/or the amplitude of the vibration. Also, the change in vibration frequency and/or amplitude can be linear or can be stepped, as permitted by the particular actuator 135 used.

It will be appreciated that the routines 500 and 600 improve the operation of the computer 155 by relieving the computer 155 of the burden of computing the velocity of the stylus 100 and encoding the velocity information for transmission to the stylus 100. These routines thus improve the operation of the computer 155 by freeing up computing and I/O resources so that other applications can use those resources.

Figure 7:
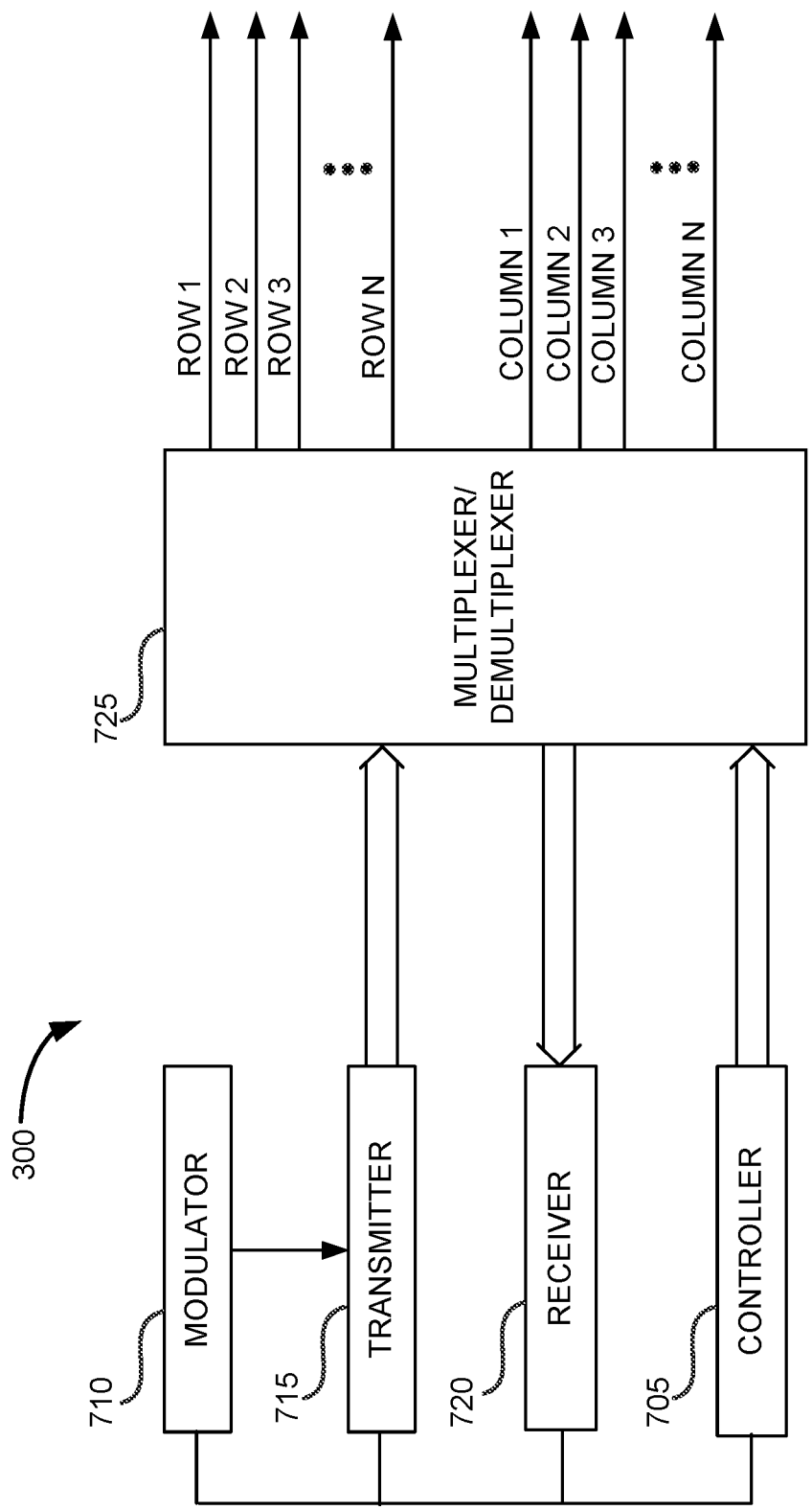
FIG. 7 is a block diagram of an exemplary digitizer.

FIG. 7 is a block diagram of an exemplary display screen digitizer 300. The display screen digitizer 300 has a digitizer controller 705, a modulator 710, a transmitter 715, a receiver 720, and a multiplexer/demultiplexer 725. The transmitter 715 generates drive signals for the electrodes 305, 310 for touch screen capability, and the receiver 720 receives signals from the electrodes 305, 310 for touch screen capability.

A conventional touch-sensitive display screen has electrodes under the glass surface, and these electrodes are used for touch detection. In a mutual capacitance touch-sensitive display screen, a transmitter 715 is connected by a multiplexer/demultiplexer 725 to one set of electrodes (e.g., row electrodes 305 of FIG. 3A) and transmits a driving signal sequentially on that set of electrodes (e.g., on the row 1 electrode, then on the row 2 electrode, then on the row 3 electrode, etc.). A receiver(s) is connected by the multiplexer/demultiplexer 725 to the other set of electrodes (e.g., column electrodes 310 of FIG. 3A) and monitors for changes in the output of that other set of electrodes. If the screen is touched, the output of the column electrode changes due to a change in the capacitive coupling between the driven row electrode and a column electrode at/near the point where the screen is being touched. This permits detection of the screen being touched, and detection of the location where the screen is being touched. The driving signals are typically between 5 Volts and 20 Volts peak-to-peak. In one implementation they are around 10 volts peak-to-peak. These driving signals can also be used, as described herein, to provide information which can be used by the stylus 100 to determine its position and/or its velocity.

In one implementation, the display screen digitizer 300 has the multiplexer/demultiplexer 725. The digitizer controller 705 causes the multiplexer/demultiplexer 725 to alternately couple the outputs of the transmitter 715 to the row electrodes 305 and to couple the column electrodes 310 to the inputs of one or more receivers 720, and then to couple the outputs of the transmitter 715 to the column electrodes 310 and to couple the row electrodes 305 to the inputs of the receiver(s) 715. A single transmitter 715 can be used, with the output of the transmitter 715 being multiplexed to the various electrodes 305, 310, or multiple transmitters 715 can be used, one for each electrode 305, 310 or group of electrodes 305, 310. Likewise, there can be a single modulator 710, which modulates the single transmitter 715 or the plurality of transmitters 715, or there can be multiple modulators, one for each transmitter 715 or group of transmitters 715. A single receiver 720 can be used, with the signals from the various electrodes being multiplexed to the receiver, or multiple receivers can be used, one for each electrode or group of electrodes. Thus, the driving signals from the transmitter(s) 715 are alternately placed on the row electrodes 305 and the column electrodes 310, and the receiver (s) 720 is responsive to signals on its inputs to provide one or more touch detection signals when a person touches the display screen 150. The touch sensing capability of the display screen 150 is therefore not adversely affected by alternatingly driving the row electrodes 305 and the column electrodes 310, but signals are now being provided to the display screen 150 in a manner which allows the stylus 100 to determine its position and/or velocity across the display screen 150.

In a self-capacitance touch-sensitive display screen, the transmitter 715 is connected by the multiplexer/demultiplexer 725 to one electrode (e.g., row electrode 305A of FIG. 3A) and transmits a driving signal on that electrode. The receiver 720 is also connected by the multiplexer/demultiplexer 725 to that electrode and monitors for a change in the output voltage (or amount of stored electrical charge) of that electrode. If the screen is touched, the output voltage (or charge) of that electrode changes due to a change in the capacitive coupling between the driven electrode and circuit ground at/near the point where the screen is being touched. This process is repeated for each row electrode and each column electrode. This permits detection of the screen being touched, and detection of the location where the screen is being touched. Similarly, signals are being provided by the display screen 150 in a manner which allows the stylus 100 to determine its velocity across the display screen 150.

The driving signals are preferably provided at a repetition rate of at least 100 Hz, and more preferably at least 200 Hz for a good user experience (a quick response to the user touching the screen). Higher repetition rates can be used but provide decreasing additional benefit. The driving signals are preferably, but not necessarily, sent as a pulse train of 4 to 32 pulses.

Preferably, in both the mutual capacitance and self-capacitance implementations, the display screen digitizer 300 has a modulator 710 that modulates the outputs of the transmitter 715 so that the electrode drive signals convey row (or column) identification information. This does not affect the operation of the display screen 150 or the touch sensing capability thereof, but signals are now provided so that the stylus 100 can determine its position on the display screen 150 in addition to determining its velocity across the display screen 150. As discussed above, the modulation can add row or column identification information to the driving signals by time, frequency, or code multiplexing techniques, or a combination thereof.

Preferably, the modulation provides a unique address for each row and for each column. In some cases, however, there can be so many rows and columns that providing a unique identification for each row and for each column adds so much information to the driving signals that the frequency of repetition or alternation of the driving signals is adversely affected and/or the response of the system to a touch, swipe, or other action by the user becomes noticeably delayed. Therefore, in another implementation, the row identification and the column identification are abbreviated, that is, they are reused several times across the display screen 150. If, for example, five unique identifications can be used without adverse effect, then row identification #1 would be transmitted on rows 1, 6, 11, 16, etc., row identification #2 would be transmitted on rows 2, 7, 12, 17, etc., row identification #3 would be transmitted on rows 3, 8, 13, 18, etc., row identification #4 would be transmitted on rows 4, 9, 14, 19, etc., and row identification #5 would be transmitted on rows 5, 10, 15, 20, etc. Similarly, column identification #1 would be transmitted on columns 1, 6, 11, 16, etc., column identification #2 would be transmitted on columns 2, 7, 12, 17, etc., column identification #3 would be transmitted on columns 3, 8, 13, 18, etc., column identification #4 would be transmitted on columns 4, 9, 14, 19, etc., and column identification #5 would be transmitted on columns 5, 10, 15, 20, etc. This information can be transmitted simultaneously on, for example, rows 1, 6, 11, 16, etc., because the electrostatic coupling falls off rapidly with distance and with intervening conductors, so the interference between, for example, rows 6 and 1, or rows 6 and 11, is minimal.

The use of five row identifications and five column identifications is merely exemplary, and a different number of row identifications or column identifications can be used. Further, the number of row identifications can be different from the number of column identifications, such as where the display screen 150, or the desired writing or drawing area within the display screen 150, is not square.

The absolute position of the stylus 100 on the display screen 150 can be updated when the stylus 100 has information about its previous absolute position. As the user moves the stylus 100, the stylus 100 detects the information (row number, column number) as it crosses over the rows and/or columns and uses that information to determine its new absolute position. The stylus 100 can also count the rows and/or columns as it crosses over them, noting whether the row number and/or column number is increasing or decreasing, and use that information to determine its new absolute position. Presumably, the stylus 100 is not being moved so quickly that it crosses more than, e.g., 5 rows (or columns) in this example, more quickly than the refresh time over those, e.g., 5 rows (or columns). This also presumes that the pen remains in detection range (e.g., does not hover past the maximum detectable height allowed by the digitizer).

When row and column identifications are reused as in this example, the initial determination of absolute position requires additional information to disambiguate shared identifiers. In one implementation, the digitizer 300 and stylus 100 are first synchronized to each other via RF, IR, or an electrostatic channel, such that both have knowledge of the start of the digitizer drive sequence. The requirement is that electrodes using the same identifier are not driven simultaneously. For example, digitizer 300 may sequentially place a drive signal on each 5th row/column (0, 5, 10, 15, etc.). The driving sequence pattern (e.g., row 0, 5, 10, 15, etc.; column 0, 5, 10, 15, etc.) and the timing are known by both the digitizer 300 and the stylus 100, such as by being pre-programmed into their respective memories. The driving sequence pattern can be sequential or can be some other pattern known to both the digitizer 300 and the stylus 100. Because their sequence is known by both the digitizer 300 and the stylus 100, electrodes sharing an identifier can be distinguished.

It is noted that disambiguating shared identifiers in the example above is equivalent to identifying the coordinates of the 5×5 area where the tip 105 is located. By measuring the signal strength and knowing the driving sequence pattern, the stylus 100 can detect the position of this 5×5 area driving only a subset of the row and column electrodes. For example, the stylus 100 detects that the signal strength peaks when the timing and pattern indicate that row 30 and on column 65 are driven. The stylus 100 therefore knows that it is located somewhere been rows 28 and 32, and columns 63 and 67. Once the stylus coordinates are determined to a 5×5 area, the 5 unique row and column identifications are sufficient to localize it within the area.

Figure 8:
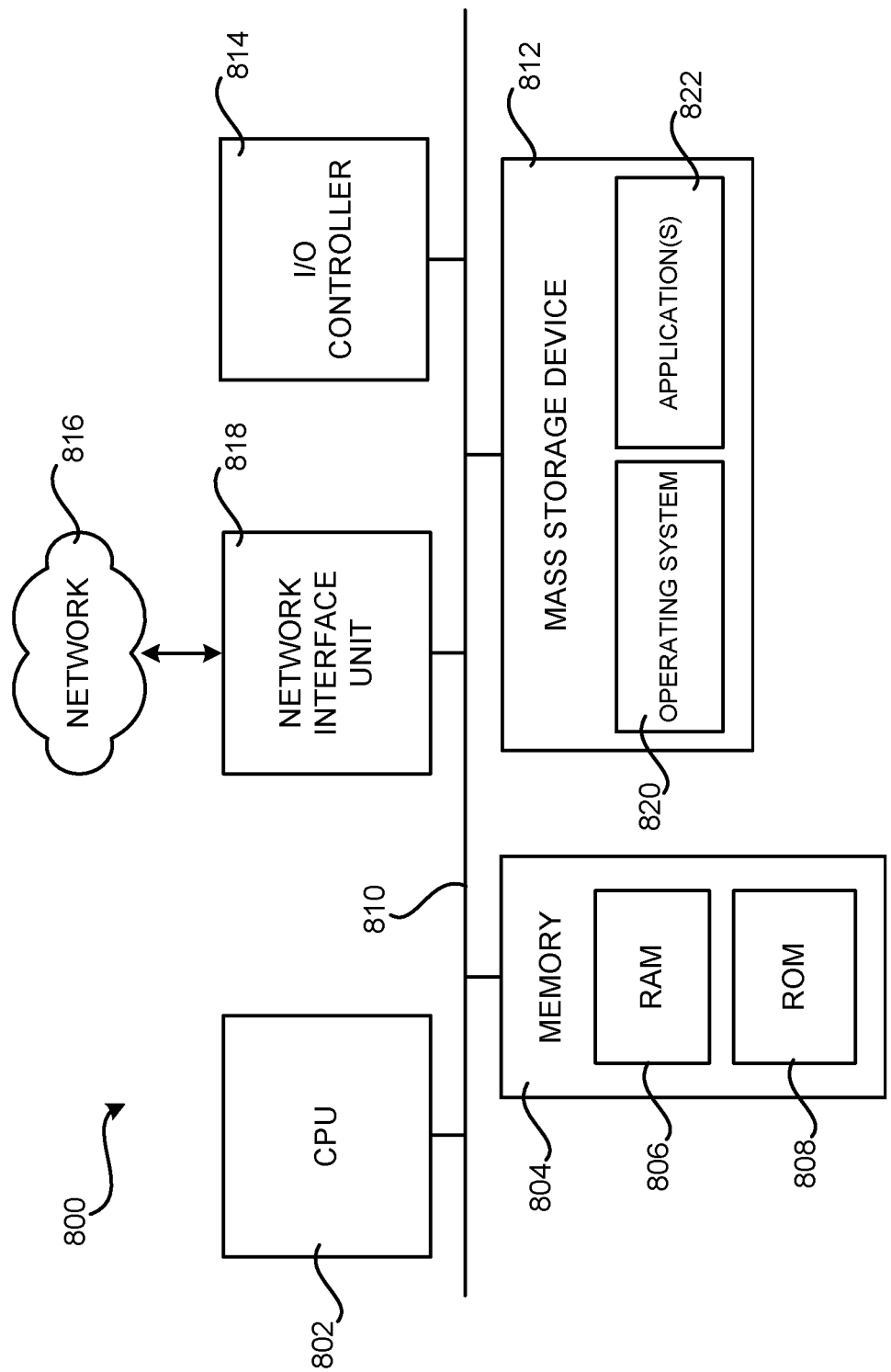
FIG. 8 is a computer architecture diagram illustrating a computer hardware and software architecture for a computing system capable of implementing aspects of the technologies presented herein.
Figure 9:
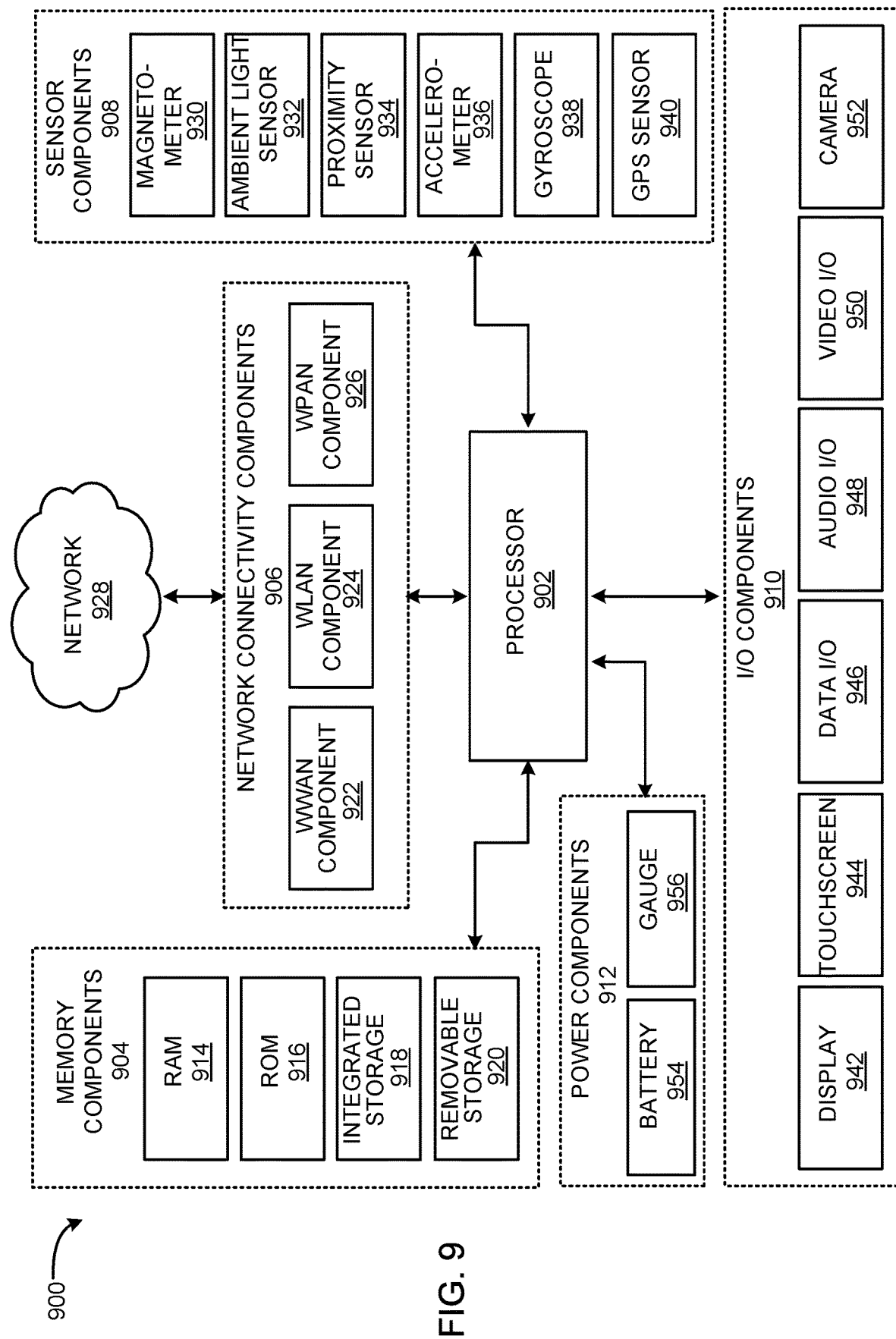
FIG. 9 shows an illustrative computing device architecture for a computing device that is capable of executing the various software components described herein.

The exemplary computer architectures described below with respect to FIGS. 8 and 9 are representative of the computer 155, the stylus 100, and other types of computing devices suitable for executing the software components and procedures described herein and controlling the hardware components described herein, such as a server computer, mobile phone, e-reader, smart phone, desktop computer, netbook computer, tablet computer, laptop computer, game computer, and those that facilitate mobile computing due, in part, to form factor, wireless connectivity, and/or battery-powered operation. In some configurations, the computing devices include, but are not limited to, smart mobile telephones, tablet devices, slate devices, portable video game devices, and the like. It will be appreciated that the block diagram illustrated in FIG. 2 is a specific implementation of such architectures for use in a stylus 100 and, accordingly, some components illustrated in these architectures, such as a network interface unit, removable storage, camera, magnetometer, GPS sensor, etc., are neither necessary nor desirable to accomplish the functions of the stylus 100.

FIG. 8 is a general computer architecture diagram that shows an illustrative computer hardware and software architecture for a computing system 800 capable of implementing aspects of the technologies presented herein. Although a general purpose computer will have some of these components, such as a central processing unit (CPU) 802, memory 804, a mass storage device 812, an input/output controller 814, and a network interface unit 818, and might be able to perform certain basic computer functions, such as addition and subtraction, a general purpose computer cannot perform, and does not perform, the various processes and functions described herein, and therefore cannot achieve the operations and procedures described herein. Rather, such a general purpose computer must be modified by adding the specialized programming described herein, which transforms it into a special purpose computer.

The software components described herein, particularly but not limited to the application(s) 822, when loaded into the CPU 802 and executed, transform the CPU 802 and the overall computer 800 from a general-purpose computing system into a special-purpose computing system customized to facilitate the functionality presented herein. Such specialized programming also improves the operation and functioning of the computer itself by eliminating the tasks of determining the velocity and encoding the velocity information for transmission.

In this regard, it should be appreciated that the computer 800 can be utilized to implement a computing device capable of executing the software components presented herein. For example, and without limitation, the computer 800 can be utilized to implement a computing device capable of executing the Windows server operating system, and/or any of the other software components described above.

The computer 800 includes a CPU 802, a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer 800, such as during startup, is stored in the ROM 808. The computer 800 further includes a mass storage device 812 for storing the operating system 820 and one or more applications 822, etc. The operating system 820 may also include instructions for operating the display screen digitizer and causing the display screen digitizer to provide information on the electrodes 305, 310 of the display screen. The applications 822 can include notepads, drawing programs, writing programs, and other types of user programs, and a program from controlling the operation of the display screen digitizer. The mass storage device 812 can also be configured to store other types of programs and data, such as default values, settings, patterns, etc.

The mass storage device 812 is connected to the CPU 802 through a mass storage controller (not shown) connected to the system bus 810. The mass storage device 812 and its associated computer-readable storage media provide non-volatile storage for the computer 800. Although the description of computer-readable storage media contained herein refers to a mass storage device 812, such as a hard disk or CD-ROM drive, it should be appreciated by those skilled in the art that computer-readable storage media can be any available storage medium or media or communication medium or media that can be accessed by the computer 800 to retrieve instructions and/or data.

By way of example, and not limitation, computer-readable storage medium can include volatile and non-volatile, removable and non-removable media implemented in any method or technology for storage of information such as computer readable instructions, data structures, program modules or other data. For example, computer-readable storage medium includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other tangible medium that can be used to store the desired information and which can be accessed by the computer 800.

The terms computer-readable storage medium and computer-readable storage media, as used herein, comprise only statutory subject matter within the meaning of 35 U.S.C. § 101 as interpreted or defined by a court of competent jurisdiction. These terms do not, for example, encompass propagated waves per se or signals per se, nor do these terms encompass an interpretation that renders a claim invalid under 35 U.S.C. § 101.

Communication media does not include computer-readable storage media but does include computer readable instructions, data structures, program modules, or other data in a modulated data signal such as a carrier wave or other transport mechanism, and includes the delivery media, such as but not limited to transmitters, receivers, wiring, fiber optic lines, etc., associated therewith. The term "modulated data signal" means a signal that has one or more of its characteristics changed or set in a manner as to encode information in the signal. By way of example, and not limitation, communication media includes wired media such as a wired network or direct-wired connection, and the delivery media associated therewith, and wireless media such as acoustic, RF, infrared and other wireless media, and the delivery media associated therewith. Combinations of the any of the above should also be included within the scope of communication media.

According to various configurations, the computer 800 can operate in a networked environment using logical connections to remote computers through a network such as the network 816. The computer 800 can connect to the network 816 through a network interface unit 818 connected to the system bus 810. It should be appreciated that the network interface unit 818 also can be utilized to connect to other types of networks and remote computer systems. In a typical environment, numerous consumers will use laptop computers, desktop computers, personal digital assistants, "slate" or tablet computing devices, smartphones, video game consoles, other types of mobile computing devices, and virtually any type of personal computing device (not shown), to connect to the computer 800 through the network 816 and request access to, and use, the various applications 822 available on the computer 800.

The computer 800 also can include an input/output controller 814 for receiving and processing input from a number of other devices, including a keyboard, mouse, touch input, or electronic stylus 100 (not shown in FIG. 8). Similarly, the I/O controller 814 can provide output to a display screen, a printer, or other type of output device (also not shown in FIG. 8). Thus, the I/O controller 814 provides for user input, such as for setting the different values discussed herein, and for presenting options, system information, resource usage, and other parameters for viewing and possible action by the user. The user can also access the computer 800 through the network interface unit 818 to perform these user actions.

The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the various functions and/or software modules presented herein also can transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description.

In light of the above, it should be appreciated that many types of physical transformations take place in the computer 800 in order to store and execute the software components presented herein. It should also be appreciated that the architecture shown for the computer 800, or a similar architecture, can be utilized to implement other types of computing devices, including hand-held computers, embedded computer systems, mobile devices such as smartphones and tablets, and other types of computing devices known to those skilled in the art. It is also contemplated that the computer 800 might not include all of the components shown, can include other components that are not explicitly shown, or can utilize an architecture completely different than that shown.

FIG. 9 shows an illustrative computing device architecture 900 for a computing device that is capable of executing the various software components and controlling the various hardware components described herein. Aspects of the computing device architecture 900 are applicable to traditional desktop computers, portable computers (e.g., laptops, notebooks, ultra-portables, and netbooks), server computers, game systems, and other computer systems. For example, the single touch and multi-touch aspects disclosed herein can be applied to desktop computers that utilize a touchscreen or some other touch-enabled device, such as a touch-enabled track pad or touch-enabled mouse.

The illustrated computing device architecture 900 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components, the components can be connected electrically in order to interact and carry out device functions. In some configurations, the components are arranged so as to communicate via one or more busses (not shown).

The processor 902 includes one or more CPU cores configured to control system resources, process data, execute computer-executable instructions of one or more application programs, and to communicate with other components of the computing device architecture 900 in order to perform aspects of the functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU 802, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 902 is configured to communicate with a discrete GPU (not shown). In any case, the CPU 802 and GPU can be configured in accordance with a co-processing CPU/GPU computing model, wherein the sequential part of an application executes on the CPU 802 and the computationally intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. Moreover, the processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a RAM 914, a ROM 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein might also be connected. As such, the integrated storage 918 is integrated into the computing device. The integrated storage 918 can be configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available and shown to a user as a total combined capacity of the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

One or more of the memory components 904 can be used to store an operating system. According to various configurations, the operating system includes, but is not limited to, the WINDOWS MOBILE OS, the WINDOWS PHONE OS, or the WINDOWS OS from MICROSOFT CORPORATION, BLACKBERRY™ OS from RESEARCH IN MOTION™, LTD. of Waterloo, Ontario, Canada, IOS from APPLE™ Inc. of Cupertino, Calif., and ANDROID™ OS from GOOGLE™, Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from a network 928, which can be a WWAN, a WLAN, or a WPAN. Although a single network 928 is illustrated, the network connectivity components 906 can facilitate simultaneous communication with multiple networks. For example, the network connectivity components 906 can facilitate simultaneous communications with multiple networks via one or more of a WWAN, a WLAN, or a WPAN.

The network 928 can be a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 928 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 928 can be configured to provide voice and/or data communications with any combination of the above technologies. The network 928 can be configured or adapted to provide voice and/or data communications in accordance with future generation technologies.

In some configurations, the WWAN component 922 is configured to provide dual-multi-mode connectivity to the network 928. For example, the WWAN component 922 can be configured to provide connectivity to the network 928, wherein the network 928 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 928 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 928 via the WI-FI access points. Such connections can be secured via various encryption technologies including, but not limited, WI-FI Protected Access ("WPA"), WPA2, Wired Equivalent Privacy ("WEP"), and the like.

The network 928 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 930, an ambient light sensor 932, a proximity sensor 934, an accelerometer 936, a gyroscope 938, and a Global Positioning System sensor ("GPS sensor") 940. It is contemplated that other sensors, such as, but not limited to, temperature sensors or shock detection sensors, might also be incorporated in the computing device architecture 900.

The magnetometer 930 is configured to measure the strength and direction of a magnetic field. In some configurations the magnetometer 930 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 930 are contemplated.

The ambient light sensor 932 is configured to measure ambient light. In some configurations, the ambient light sensor 932 provides measurements to an application program stored within one of the memory components 904 in order to automatically adjust the brightness of a display (described below) to compensate for low light and bright light environments. Other uses of measurements obtained by the ambient light sensor 932 are contemplated.

The proximity sensor 934 is configured to detect the presence of an object or thing in proximity to the computing device without direct contact. In some configurations, the proximity sensor 934 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 934 are contemplated.

The accelerometer 936 is configured to measure physical acceleration. In some configurations, output from the accelerometer 936 is used by an application program as an input mechanism to control some functionality of the application program. In some configurations, output from the accelerometer 936 is provided to an application program for use in switching between landscape and portrait modes, calculating coordinate acceleration, or exiting a sleep or standby mode of operation. Other uses of the accelerometer 936 are contemplated.

The gyroscope 938 is configured to measure and maintain orientation. In some configurations, output from the gyroscope 938 is used by an application program as an input mechanism to control some functionality of the application program. For example, the gyroscope 938 can be used for accurate recognition of movement within a 3D environment of a video game application or some other application. In some configurations, an application program utilizes output from the gyroscope 938 and the accelerometer 936 to enhance control of some functionality. Other uses of the gyroscope 938 are contemplated.

The GPS sensor 940 is configured to receive signals from GPS satellites for use in calculating a location. The location calculated by the GPS sensor 940 can be used by any application program that requires or benefits from location information. For example, the location calculated by the GPS sensor 940 can be used with a navigation application program to provide directions from the location to a destination or directions from the destination to the location. Moreover, the GPS sensor 940 can be used to provide location information to an external location-based service, such as E611 service. The GPS sensor 940 can obtain location information generated via WI-FI, WIMAX, and/or cellular triangulation techniques utilizing one or more of the network connectivity components 906 to aid the GPS sensor 940 in obtaining a location fix. The GPS sensor 940 can also be used in Assisted GPS ("A-GPS") systems.

The I/O components 910 include a display 942, a touchscreen 944, a data I/O interface component ("data I/O") 946, an audio I/O interface component ("audio I/O") 948, a video I/O interface component ("video I/O") 950, and a camera 952. In some configurations, the display 942 and the touchscreen 944 are combined. In some configurations two or more of the data I/O component 946, the audio I/O component 948, and the video I/O component 950 are combined. The I/O components 910 can include discrete processors configured to support the various interfaces described below, or might include processing functionality built-in to the processor 902.

The display 942 is an output device configured to present information in a visual form. In particular, the display 942 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 942 is a liquid crystal display ("LCD") utilizing any active or passive matrix technology and any backlighting technology (if used). In some configurations, the display 942 is an organic light emitting diode ("OLED") display. Other display types are contemplated.

The touchscreen 944 is an input device configured to detect the presence and location of a touch. The touchscreen 944 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 944 is incorporated on top of the display 942 as a transparent layer to enable a user to use one or more touches to interact with objects or other information presented on the display 942. In other configurations, the touchscreen 944 is a touch pad incorporated on a surface of the computing device that does not include the display 942. For example, the computing device can have a touchscreen incorporated on top of the display 942 and a touch pad on a surface opposite the display 942.

In some configurations, the touchscreen 944 is a single-touch touchscreen. In other configurations, the touchscreen 944 is a multi-touch touchscreen. In some configurations, the touchscreen 944 is configured to detect discrete touches, single touch gestures, and/or multi-touch gestures.

The data I/O interface component 946 is configured to facilitate input of data to the computing device and output of data from the computing device. In some configurations, the data I/O interface component 946 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 948 is configured to provide audio input and/or output capabilities to the computing device. In some configurations, the audio I/O interface component 946 includes a microphone configured to collect audio signals. In some configurations, the audio I/O interface component 948 includes a headphone jack configured to provide connectivity for headphones or other external speakers. In some configurations, the audio interface component 948 includes a speaker for the output of audio signals. In some configurations, the audio I/O interface component 948 includes an optical audio cable out.

The video I/O interface component 950 is configured to provide video input and/or output capabilities to the computing device. In some configurations, the video I/O interface component 950 includes a video connector configured to receive video as input from another device (e.g., a video media player such as a DVD or BLU-RAY player) or send video as output to another device (e.g., a monitor, a television, or some other external display). In some configurations, the video I/O interface component 950 includes a High-Definition Multimedia Interface ("HDMI"), mini-HDMI, micro-HDMI, DISPLAYPORT, or proprietary connector to input/output video content. In some configurations, the video I/O interface component 950 or portions thereof is combined with the audio I/O interface component 948 or portions thereof.

The camera 952 can be configured to capture still images and/or video. The camera 952 can utilize a charge coupled device ("CCD") or a complementary metal oxide semiconductor ("CMOS") image sensor to capture images. In some configurations, the camera 952 includes a flash to aid in taking pictures in low-light environments. Settings for the camera 952 can be implemented as hardware or software buttons.

Although not illustrated, one or more hardware buttons can also be included in the computing device architecture

900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 954, which can be connected to a battery gauge 956. The batteries 954 can be rechargeable or disposable. Rechargeable battery types include, but are not limited to, lithium polymer, lithium ion, nickel cadmium, and nickel metal hydride. Each of the batteries 954 can be made of one or more cells.

The battery gauge 956 can be configured to measure battery parameters such as current, voltage, and temperature. In some configurations, the battery gauge 956 is configured to measure the effect of a battery's discharge rate, temperature, age and other factors to predict remaining life within a certain percentage of error. In some configurations, the battery gauge 956 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector (not shown), which can be combined with one or more of the aforementioned I/O components 910. The power components 912 can interface with an external power system or charging equipment via a power I/O component 912. Other configurations can also be utilized.

It should be appreciated that the various software components described herein can be implemented using or in conjunction with binary executable files, dynamically linked libraries (DLLs), APIs, network services, script files, interpreted program code, software containers, object files, byte-code suitable for just-in-time ("JIT") compilation, and/or other types of program code that can be executed by a processor to perform the operations described herein. Other types of software components not specifically mentioned herein can also be utilized.

In view of the above, the disclosure presented herein also encompasses the subject matter set forth in the following clauses:

Clause 1: A stylus for use with a display screen which is touch-sensitive, the stylus comprising: a sensor to provide a sensor signal, the sensor being at an end of the stylus which is adapted to be placed into contact with the display screen; an actuator, within the stylus and responsive to a control signal, to vibrate the stylus; a memory, within the stylus, containing operating instructions; a processor, within the stylus and connected to the memory, to execute the operating instructions, to: receive the sensor signal; process the sensor signal to determine a velocity of the stylus across the display screen; and provide the control signal based upon the velocity; and a power supply, within the stylus, to provide operating power to at least the processor.

Clause 2: The stylus of clause 1 wherein the operating instructions in the memory cause the processor to: process the sensor signal by detecting changes in the sensor signal; and determine the velocity based at least in part upon the changes.

Clause 3: The stylus of any of clauses 1-2 wherein the operating instructions in the memory cause the processor to provide the control signal to change the power spectral density at which the actuator vibrates as a function of velocity.

Clause 4: The stylus of any of clauses 1-3 wherein the operating instructions in the memory cause the processor to provide the control signal to change the power spectral density at which the actuator vibrates as a function of velocity, such as to change a rate at which the actuator vibrates the stylus as the velocity changes.

Clause 5: The stylus of any of clauses 1-4 wherein the operating instructions in the memory cause the processor to provide the control signal to change the power spectral density at which the actuator vibrates as a function of velocity, such as to change an amplitude at which the actuator vibrates the stylus as the velocity changes.

Clause 6: The stylus of any of clauses 1-5 wherein the operating instructions in the memory cause the processor to provide the control signal to change at least one of a rate or an amplitude at which the actuator vibrates the stylus as the velocity changes.

Clause 7: The stylus of any of clauses 1-6 wherein the memory contains data defining a vibration pattern, including a random process, and the processor retrieves the vibration pattern from the memory and generates the control signal to correspond to the vibration pattern, wherein the control signal causes the actuator to vibrate in accordance with the vibration pattern.

Clause 8: The stylus of any of clauses 1-7 wherein the memory contains statistical information regarding vibrations as a pencil is drawn across paper, and the processor retrieves the statistical information from the memory and generates the control signal to correspond to the statistical information, wherein the control signal causes the actuator to vibrate according to the statistical information so as to simulate a pencil being drawn across paper.

Clause 9: The stylus of any of clauses 1-8 wherein the sensor comprises an electrostatic sensor to detect electrostatic signals provided by the display screen to provide the sensor signal.

Clause 10: The stylus of any of clauses 1-9 wherein: the sensor comprises an electrostatic sensor responsive to a first reference signal provided by the display screen to provide a first sensor signal, and responsive to a second reference signal provided by the display screen to provide a second sensor signal; and the sensor signal comprises the first sensor signal and the second sensor signal; the operating instructions in the memory cause the processor to: process the sensor signal by determining a first position of the stylus on the display screen based upon the first sensor signal and the second sensor signal at a first time; determine a second position of the stylus on the display screen based upon the first sensor signal and the second sensor signal at a second time; and determine the velocity based at least in part upon a difference between the first position and the second position.

Clause 11: The stylus of any of clauses 1-10 wherein: the sensor comprises an electrostatic sensor responsive to a first reference signal provided by the display screen to provide a first sensor signal, and responsive to a second reference signal provided by the display screen to provide a second sensor signal; and the sensor signal comprises the first sensor signal and the second sensor signal; the operating instructions in the memory cause the processor to: process the sensor signal by determining a first position of the stylus on the display screen based upon the first sensor signal and the second sensor signal at a first time; determine a second position of the stylus on the display screen based upon the first sensor signal and the second sensor signal at a second time; if both the first position and the second position are within a predetermined area on the display screen, to determine the velocity based at least in part upon a difference between the first position and the second position.

Clause 12: The stylus of any of clauses 1-11 wherein, if neither the first position nor the second position are within the predetermined area, the processor provides a unique signal as the control signal.

Clause 13: The stylus of any of clauses 1-12 wherein the unique signal is an indication that the stylus is not within the predetermined area.

Clause 14: The stylus of any of clauses 1-13 wherein the unique signal is cessation of vibration of the stylus.

Clause 15: The stylus of any of clauses 1-14 wherein the sensor comprises a force sensor to detect texture in a surface of the display screen to provide the sensor signal.

Clause 16: The stylus of any of clauses 1-15 wherein: the sensor comprises a force sensor responsive to changes in a surface texture of the display screen to provide the sensor signal responsive to the stylus being moved on the display screen; and the operating instructions in the memory cause the processor to: process the sensor signal to determine a characteristic of the sensor signal; and determine the velocity based at least in part upon the characteristic of the sensor signal.

Clause 17: The stylus of any of clauses 1-16 wherein the characteristic of the sensor signal is a rate of change of the sensor signal.

Clause 18: The stylus of any of clauses 1-17 wherein: the sensor comprises a force sensor to detect texture in a surface of the display screen to provide the sensor signal; and the operating instructions in the memory cause the processor to: determine the velocity based at least in part upon a time difference between a first occurrence of the sensor signal having a predetermined characteristic corresponding to the texture and a subsequent occurrence of the sensor signal having the predetermined characteristic.

Clause 19: The stylus of any of clauses 1-18 wherein: the sensor comprises a force sensor to detect texture in a surface of the display screen to provide the sensor signal; and the operating instructions in the memory further cause the processor to: determine a position of the stylus on the display screen based upon a pattern detected in the sensor signal; if the position is within a predetermined area, to determine the velocity based at least in part upon changes in the pattern detected; and if the position is not within the predetermined area, to provide a unique signal as the control signal.

Clause 20: The stylus of any of clauses 1-19, wherein a first area of the display screen has a first pattern to the texture, and a second area of the display screen has a second, different pattern to the texture.

Clause 21: The stylus of any of clauses 1-20 wherein the unique signal is an indication that the stylus is not within the predetermined area.

Clause 22: The stylus of any of clauses 1-21 wherein the unique signal is cessation of vibration of the stylus.

Clause 23: A memory having operating instructions stored thereupon that, when executed by a processor in a stylus, cause the processor to: receive a sensor signal from a sensor in the stylus, the sensor being at an end of the stylus which is adapted to be placed into contact with a display screen which is touch-sensitive; process the sensor signal to determine a velocity of the stylus across the display screen; and provide a control signal, based upon the velocity, to an actuator in the stylus to cause the actuator to vibrate the stylus.

Clause 24: The memory of clause 23 wherein the operating instructions in the memory cause the processor to: process the sensor signal by detecting changes in the sensor signal; and determine the velocity based upon at least in part upon the changes in the sensor signal.

Clause 25: The memory of any of clauses 23-24 wherein the operating instructions in the memory cause the processor to provide the control signal to increase the rate at which the vibrator vibrates the stylus as the velocity increases.

Clause 26: The memory of any of clauses 23-25 wherein the operating instructions in the memory cause the processor to provide the control signal to decrease the rate at which the vibrator vibrates the stylus as the velocity decreases.

Clause 27: The memory of any of clauses 23-26 wherein the operating instructions in the memory cause the processor to provide the control signal to increase the amplitude at which the vibrator vibrates the stylus as the velocity increases.

Clause 28: The memory of any of clauses 23-27 wherein the operating instructions in the memory cause the processor to provide the control signal to decrease the amplitude at which the vibrator vibrates the stylus as the velocity decreases.

Clause 29: The stylus of any of clauses 23-28 wherein the memory contains data defining a vibration pattern, and the operating instructions in the memory cause the processor to retrieve the vibration pattern from the memory and implement the vibration pattern to cause the actuator to vibrate in accordance with the vibration pattern.

Clause 30: The stylus of any of clauses 23-29 wherein the memory contains statistical information regarding vibrations as a pencil is drawn across paper, and the operating instructions in the memory cause the processor to retrieve the statistical information from the memory and implement the statistical information to cause the actuator to vibrate according to the statistical information so as to simulate a pencil being drawn across paper.

Clause 31: The memory of any of clauses 23-30 wherein the sensor comprises an electrostatic sensor to detect a first reference signal provided by the display screen to provide a first sensor signal, and a second reference signal provided by the display screen to provide a second sensor signal, and wherein the sensor signal comprises the first sensor signal and the second sensor signal provided by the display screen: the operating instructions in the memory cause the processor to: process the sensor signal by determining a first position of the stylus on the display screen based upon the first sensor signal and the second sensor signal at a first time; determine a second position of the stylus on the display screen based upon the first sensor signal and the second sensor signal at a second time; determine the velocity of the stylus based at least in part upon a difference between the first position and the second position.

Clause 32: The memory of any of clauses 23-31 wherein the sensor comprises an electrostatic sensor to detect a first reference signal provided by the display screen to provide a first sensor signal and a second reference signal provided by the display screen to provide a second sensor signal, wherein the sensor signal comprises the first sensor signal and the second sensor signal; and wherein: the operating instructions in the memory cause the processor to: process the sensor signal by determining a first position of the stylus on the display screen based upon the first sensor signal and the second sensor signal at a first time; and process the sensor signal by determining a second position of the stylus on the display screen based upon the first sensor signal and the second sensor signal at a second time; and if both the first position and the second position are within a predetermined area on the display screen, to determine the velocity of the stylus based at least in part upon a difference between the first position and the second position Clause 33: The memory of any of clauses 23-32 wherein, if neither the first position nor the second position is within the predetermined area, the processor provides a unique signal as the control signal.

Clause 34: The memory of any of clauses 23-33 wherein the unique signal is an indication that the stylus is not within the predetermined area.

Clause 35: The memory of any of clauses 23-34 wherein the unique signal is cessation of vibration of the stylus.

Clause 36: The memory of any of clauses 23-35 wherein the sensor comprises a force sensor to detect texture in a surface of the display screen to provide the sensor signal, and wherein: the operating instructions in the memory cause the processor to: process the sensor signal to determine a characteristic of the sensor signal; and determine the velocity based at least in part upon the characteristic of the sensor signal.

Clause 37. The memory of any of clauses 23-36 wherein the characteristic of the sensor signal is a rate of change of the sensor signal.

Clause 38: The memory of any of clauses 23-37 wherein the sensor comprises a force sensor to detect texture in a surface of the display screen to provide the sensor signal, and wherein: the operating instructions in the memory cause the processor to: determine the velocity by determining a time difference between a first occurrence of the sensor signal having a predetermined characteristic corresponding to the texture and a subsequent occurrence of the sensor signal having the predetermined characteristic.

Clause 39: The memory of any of clauses 23-38 wherein the sensor comprises a force sensor to detect texture in a surface of the display screen to provide the sensor signal; and the operating instructions in the memory cause the processor to: determine a position of the stylus on the display screen based upon a pattern detected in the sensor signal; if the position is within a predetermined area of the display screen, to provide the control signal based upon the sensor signal.

Clause 40: The memory of any of clauses 23-39 wherein, if the position is not within the predetermined area, the processor provides a unique signal as the control signal.

Clause 41: The memory of any of clauses 23-40 wherein the unique control signal is an indication that the stylus is not within the predetermined area.

Clause 42: The memory of any of clauses 23-41 wherein the unique signal is cessation of vibration of the stylus.

Clause 43: A stylus for use with a display screen which is touch-sensitive, the stylus comprising: a sensor to provide a sensor signal, the sensor being at an end of the stylus which contacts the display screen; an actuator, within the stylus and responsive to a control signal, to vibrate the stylus; a memory, within the stylus, containing operating instructions; a processor, within the stylus and connected to the memory, to execute the operating instructions, to: receive the sensor signal from the sensor; process the sensor signal by detecting changes in the sensor signal between a first time and a second time; determine a velocity of the stylus across the display screen based upon the changes; and provide the control signal based upon the velocity, the control signal at least one of increasing a rate at which the actuator vibrates the stylus as the velocity increases and decreasing an amplitude at which the actuator vibrates the stylus as the velocity decreases; and a power supply, within the stylus, to provide operating power to at least the processor.

Clause 44: The stylus of clause 43 wherein the sensor is one of an electrostatic sensor or a force sensor.

Clause 45: The stylus of any of clauses 43-44 wherein the operating instructions further cause the processor to: determine a position of the stylus on the display screen; and to provide the control signal based upon the velocity if the stylus is within a predetermined area on the display screen.

Clause 46: The stylus of clauses 43-45 wherein, if the stylus is not within the predetermined area on the display screen, the operating instructions further cause the processor to provide a unique signal as the control signal.

Clause 47: The stylus of any of clauses 43-46 wherein the unique signal is an indication that the stylus is not within the predetermined area.

Clause 48: A stylus for use with a display screen which is touch-sensitive, the stylus adapted to be held by a human hand, the stylus comprising: an electrostatic sensor responsive to a first reference signal provided by the display screen to provide a first sensor signal, and responsive to a second reference signal provided by the display screen to provide a second sensor signal, the electrostatic sensor being at an end of the stylus which is adapted to be placed into contact with the display screen; an actuator, within the stylus and responsive to a control signal, to vibrate the stylus; a memory, within the stylus, containing operating instructions; a processor, within the stylus and connected to the memory, to execute the operating instructions, to: receive the first sensor signal and the second sensor signal from the electrostatic sensor; process the first sensor signal and the second sensor signal to determine a position of the stylus on the display screen; and if the position is within a predetermined area, determine a velocity of the stylus across the display screen and provide the control signal based upon the velocity; and a power supply, within the stylus, to provide operating power to at least the processor.

Clause 49: A stylus for use with a display screen which is touch-sensitive, the stylus adapted to be held by a human hand, the stylus comprising: a force sensor responsive to changes in a surface texture of the display screen to provide a sensor signal as the stylus is moved on the display screen, the force sensor being at an end of the stylus which is adapted to be placed into contact with the display screen; an actuator, within the stylus and responsive to a control signal, to vibrate the stylus; a memory, within the stylus, containing operating instructions; a processor, within the stylus and connected to the memory, to execute the operating instructions, to: receive the sensor signal from the force sensor; process the sensor signal to determine a velocity of the stylus across the display screen; provide the control signal based upon the velocity; and a power supply, within the stylus, to provide operating power to at least the processor.

Clause 50: A display screen digitizer for a display screen which is touch-sensitive, the display screen comprising a plurality of row electrodes and a plurality of column electrodes, the display screen digitizer comprising: a transmitter to provide a first signal; a modulator to modulate the first signal; a receiver responsive to a second signal to provide a touch detection signal; a multiplexer/demultiplexer to operate in a first mode to provide the first signal from the transmitter to a row electrode and provide the second signal from a column electrode to the receiver, or to operate in a second mode to provide the first signal from the transmitter to a column electrode and provide the second signal from a row electrode to the receiver; and a controller to selectably cause the multiplexer/demultiplexer to operate in the first mode or the second mode, to selectably cause the modulator to modulate the first signal, and responsive to the touch detection signal to identify a location on the display screen where a stylus is touching the display screen.

Clause 51: The display screen digitizer of clause 50 wherein the controller causes the multiplexer/demultiplexer to alternate operation in the first mode and operation in the second mode.

Clause 52: The display screen digitizer of any of clauses 50-51 wherein the controller causes the modulator to impress an identification signal on the first signal.

Clause 53: The display screen digitizer of any of clauses 50-52 wherein the controller causes the modulator to impress a first identification signal on the first signal when the multiplexer/demultiplexer is operating in the first mode, and to impress a second identification signal on the first signal when the multiplexer/demultiplexer is operating in the second mode.

Clause 54 The display screen digitizer of any of clauses 50-53 wherein the controller causes the modulator to impress a first identification characteristic on the first signal, and to then impress a second identification characteristic on the first signal.

Clause 55: The display screen digitizer of any of clauses 50-54 wherein: there is a plurality of transmitters to provide a corresponding plurality of first signals; there is a plurality of receivers to receive a corresponding plurality of second signals to provide a corresponding plurality of touch detection signals; the multiplexer/demultiplexer operates in the first mode to provide the first signals to corresponding row electrodes and to provide the second signals to corresponding receivers, or to operate in a second mode to provide the first signals to corresponding column electrodes and to provide the second signals from corresponding row electrodes to corresponding receivers; the controller is responsive to the touch detection signals to identify the location on the display screen where the stylus is touching the display screen.

Clause 56: A method of operating a display screen digitizer for a display screen which is touch-sensitive, the display screen comprising a plurality of row electrodes and a plurality of column electrodes, the method comprising: alternately operating in a first mode to provide a first signal to a row electrode and receive a second signal from a column electrode, or a second mode to provide the first signal to a column electrode and receive the second signal from a row electrode; providing a touch detection signal based on the second signal; and identifying a location on the display screen where a stylus is touching the display screen based on the touch detection signal.

Clause 57: The method of clause 56 and: in the first mode, providing a plurality of first signals to a corresponding plurality of first rows and receiving a plurality of second signals from a corresponding plurality of first columns; and in the second mode, providing a plurality of first signals to a corresponding plurality of first columns and receiving a plurality of second signals from a corresponding plurality of first rows; providing a plurality of touch detection signals based on the plurality of second signals; and identifying the location based upon the plurality of touch detection signals.

Clause 58: The method of any of clauses 56-57 and further comprising impressing an identification signal on the first signals.

Clause 59: The method of any of clauses 56-58 and further comprising impressing first identification signals on the first signals when operating in the first mode, and impressing second identification signals on the first signals when operating in the second mode.

Clause 60: A memory having operating instructions stored thereupon that, when executed by a processor operating a display screen digitizer for a display screen which is touch-sensitive, the display screen comprising a plurality of row electrodes and a plurality of column electrodes, the operating instructions cause the processor to: alternately operate in a first mode to provide a first signal to a row electrode and receive a second signal from a column electrode, or operate a second mode to provide the first signal to a column electrode and receive the second signal from a row electrode; provide a touch detection signal based on the second signal; and identify a location on the display screen where a stylus is touching the display screen based on the touch detection signal.

Clause 61: The memory of clause 60 wherein the operating instructions in the memory further cause the processor to: in the first mode, provide a plurality of first signals to a corresponding plurality of first rows and receive a plurality of second signals from a corresponding plurality of first columns; and in the second mode, provide a plurality of first signals to a corresponding plurality of first columns and receive a plurality of second signals from a corresponding plurality of first rows; provide a plurality of touch detection signals based on the plurality of second signals; and identify the location based upon the plurality of touch detection signals.

Clause 62: The memory of any of clauses 60-61 wherein the operating instructions in the memory further cause the processor to impress an identification signal on the first signals.

Clause 63: The memory of any of clauses 60-62 wherein the operating instructions in the memory further cause the processor to, in the first mode, impress first identification signals on the first signals and, in the second mode, impress second identification signals on the first signals.

Clause 64: A display screen digitizer for a display screen which is touch-sensitive, the display screen comprising a plurality of row electrodes and a plurality of column electrodes, the display screen digitizer comprising: a transmitter to provide a first signal; a modulator to modulate the first signal; a receiver responsive to a second signal to provide a touch detection signal; a multiplexer/demultiplexer to operate in a first mode to provide the first signal from the transmitter to a row electrode and provide the second signal from the row electrode to the receiver, or to operate in a second mode to provide the first signal from the transmitter to a column electrode and provide the second signal from the column electrode to the receiver; and a controller to selectably cause the multiplexer/demultiplexer to operate in the first mode or the second mode, to selectably cause the modulator to modulate the first signal, and responsive to the touch detection signal to identify a location on the display screen where a stylus is touching the display screen.

Clause 65: The display screen digitizer of clause 64 wherein the controller causes the multiplexer/demultiplexer to alternate operation in the first mode and operation in the second mode.

Clause 66: The display screen digitizer of any of clauses 64-65 wherein the controller causes the modulator to impress an identification signal on the first signal.

Clause 67: The display screen digitizer of any of clauses 64-66 wherein the controller causes the modulator to impress a first identification signal on the first signal when the multiplexer/demultiplexer is operating in the first mode, and to impress a second identification signal on the first signal when the multiplexer/demultiplexer is operating in the second mode.

Clause 68 The display screen digitizer of any of clauses 64-67 wherein the controller causes the modulator to impress a first identification characteristic on the first signal, and to then impress a second identification characteristic on the first signal.

Clause 69: The display screen digitizer of any of clauses 64-68 wherein: there is a plurality of transmitters to provide a corresponding plurality of first signals; there is a plurality of receivers to receive a corresponding plurality of second signals to provide a corresponding plurality of touch detection signals; the multiplexer/demultiplexer operates in the first mode to provide the first signals to corresponding row electrodes and to provide the second signals from corresponding row electrodes to corresponding receivers, or to operate in a second mode to provide the first signals to corresponding column electrodes and to provide the second signals from corresponding column electrodes to corresponding receivers; and the controller is responsive to the touch detection signals to identify the location on the display screen where the stylus is touching the display screen.

Clause 70: A method of operating a display screen digitizer for a display screen which is touch-sensitive, the display screen comprising a plurality of row electrodes and a plurality of column electrodes, the method comprising: alternately operating in a first mode to provide a first signal to a row electrode and receive a second signal from the row electrode, or a second mode to provide the first signal to a column electrode and receive the second signal from the column electrode; providing a touch detection signal based on the second signal; and identifying a location on the display screen where a stylus is touching the display screen based on the touch detection signal.

Clause 71: The method of clause 70 and: in the first mode, providing a plurality of first signals to a corresponding plurality of first rows and receiving a plurality of second signals from a corresponding plurality of first rows; and in the second mode, providing a plurality of first signals to a corresponding plurality of first columns and receiving a plurality of second signals from a corresponding plurality of first columns; providing a plurality of touch detection signals based on the plurality of second signals; and identifying the location based upon the plurality of touch detection signals.

Clause 72: The method of any of clauses 70-71 and further comprising impressing an identification signal on the first signals.

Clause 73: The method of any of clauses 70-72 and further comprising impressing first identification signals on the first signals when operating in the first mode, and impressing second identification signals on the first signals when operating in the second mode.

Technologies for an autonomous haptic stylus and a display screen digitizer useful therewith have been disclosed herein. Although the subject matter presented herein has been described in language specific to computer structural features, methodological and transformative acts, specific computing machinery, and computer readable media, it is to be understood that the description above is provided by way of illustration or example only, and should not be construed as limiting. Rather, the specific features, acts and media are disclosed as example forms of implementing the claims and various modifications and changes can be made to the implementations described herein while still being within the true spirit and scope of the claims. Further, it should be appreciated that the above-described subject matter can be implemented as a computer-controlled apparatus, a computer process, a computing system, or as an article of manufacture including, but not limited to, an autonomous haptic stylus, a display screen digitizer for use therewith, or a computer-readable storage medium. Therefore, the subject matter defined in the appended claims is not necessarily limited to the specific features, acts, or media described herein.

What is claimed is:

1. A stylus for use with a display screen which is touch-sensitive, the stylus comprising:
    a sensor positioned at an end of the stylus and configured to provide a plurality of sensor signals in response to the stylus contacting the display screen or being positioned within a threshold distance of the display screen,
    wherein the sensor comprises a force sensor responsive to changes in a physical surface texture of the display screen to provide one or more of the plurality of sensor signals responsive to the stylus being moved on the display screen,
    wherein the physical surface texture includes bumps arranged in a pattern on a surface of the display screen, and
    wherein the pattern is at least one of a random pattern, a pseudo random pattern, or a uniformly spaced pattern;
    an actuator, within the stylus, configured to vibrate the stylus in response to a control signal;
    a memory, within the stylus, containing operating instructions;
    a processor, within the stylus and connected to the memory, to execute the operating instructions, and configured to:
        determine a velocity of the stylus based on the one or more of the plurality of sensor signals responsive to the changes in the physical surface texture of the display screen; and
        provide the control signal to the actuator based upon the velocity; and
    a power supply, within the stylus, configured to provide operating power to at least the processor.

2. The stylus of claim 1, wherein the processor is further configured to:
    process one or more of the plurality of sensor signals by detecting changes in the one or more of the plurality of sensor signals; and
    determine the velocity of the stylus further based at least in part upon the changes.

3. The stylus of claim 1, wherein the memory comprises data defining a vibration pattern, and the processor is further configured to:
    retrieve the vibration pattern from the memory; and
    generate the control signal to correspond to the vibration pattern, wherein the control signal causes the actuator to vibrate in accordance with the vibration pattern.

4. The stylus of claim 1, wherein the memory comprises statistical information regarding vibrations as a pencil is drawn across paper, and the processor is further configured to:
    retrieve the statistical information from the memory; and
    generate the control signal to correspond to the statistical information, wherein the control signal causes the actuator to vibrate according to the statistical information.

5. The stylus of claim 1, wherein the sensor comprises an electrostatic sensor to detect electrostatic signals provided by the display screen to provide the plurality of sensor signals.

6. The stylus of claim 1, wherein:
the sensor comprises an electrostatic sensor responsive to a first reference signal provided by the display screen to provide a first sensor signal, and responsive to a second reference signal provided by the display screen to provide a second sensor signal; and
the processor is further configured to:
process the first sensor signal by determining a first position of the stylus on the display screen based upon the first sensor signal and the second sensor signal at a first time;
determine a second position of the stylus on the display screen based upon the first sensor signal and the second sensor signal at a second time; and
determine the velocity further based at least in part upon a difference between the first position and the second position.

7. The stylus of claim 1, wherein:
the sensor comprises an electrostatic sensor responsive to a first reference signal provided by the display screen to provide a first sensor signal, and responsive to a second reference signal provided by the display screen to provide a second sensor signal; and
the processor is further configured to:
process the first sensor signal by determining a first position of the stylus on the display screen based upon the first sensor signal and the second sensor signal at a first time;
determine a second position of the stylus on the display screen based upon the first sensor signal and the second sensor signal at a second time; and
if both the first position and the second position are within a predetermined area on the display screen, determine the velocity further based at least in part upon a difference between the first position and the second position.

8. The stylus of claim 1, wherein:
the processor is further configured to:
process the one or more of the plurality of sensor signals to determine a characteristic of the one or more of the plurality of sensor signals; and
determine the velocity further based at least in part upon the characteristic of the one or more of the plurality of sensor signals.

9. The stylus of claim 1, wherein:
the processor is further configured to:
determine the velocity based at least in part upon a time difference between a first occurrence of the one or more of the plurality of sensor signals having a predetermined characteristic corresponding to the physical surface texture and a subsequent occurrence of the one or more of the plurality of sensor signals having the predetermined characteristic.

10. The stylus of claim 1, wherein the processor is further configured to:
process the one or more of the plurality of sensor signals to determine whether the stylus is within a predetermined area on the display screen; and
determine the velocity further based at least in part upon the stylus being within the predetermined area.

11. The stylus of claim 1, wherein the processor is further configured to:
process the one or more of the plurality of sensor signals to determine a change in position of the stylus; and
determine the velocity further based at least in part upon the change.

12. The stylus of claim 1, wherein the sensor further comprises an electrostatic sensor, wherein the plurality of sensor signals comprise electrode identification information of one or more electrodes of the display screen and a measured signal strength between the sensor and each of the one or more electrodes, wherein the electrode identification information includes one or more of a time, a frequency, a code, or an address to permit identification of a corresponding electrode of the one or more electrodes, and
wherein the processor is further configured to:
receive a first sensor signal of the plurality of sensor signals;
process the first sensor signal to determine a first position of the stylus relative to each of the one or more electrodes based on the electrode identification information and the measured signal strength of the first sensor signal;
receive a second sensor signal of the plurality of sensor signals;
process the second sensor signal to determine a second position of the stylus relative to each of the one or more electrodes based on the electrode identification information and the measured signal strength of the second sensor signal; and
determine the velocity of the stylus further based on the first position, the second position, and a frequency of measuring the plurality of sensor signals.

13. A memory having operating instructions stored thereupon that, when executed by a processor in a stylus, cause the processor to:
receive a plurality of sensor signals from a sensor in the stylus, the sensor being at an end of the stylus which is adapted to be placed into contact with a display screen which is touch-sensitive or placed within a threshold distance of the display screen,
wherein the sensor comprises a force sensor responsive to changes in a physical surface texture of the display screen to provide one or more of the plurality of sensor signals responsive to the stylus being moved on the display screen,
wherein the physical surface texture includes bumps arranged in a pattern on a surface of the display screen, and
wherein the pattern is at least one of a random pattern, a pseudo random pattern, or a uniformly spaced pattern;
determine a velocity of the stylus based on the one or more of the plurality of sensor signals responsive to the changes in the physical surface texture of the display screen; and
provide a control signal, based upon the velocity, to an actuator in the stylus to cause the actuator to vibrate the stylus.

14. The memory of claim 13, wherein the operating instructions in the memory further cause the processor to:
process one or more of the plurality of sensor signals by detecting changes in the one or more of the plurality of sensor signals; and
determine the velocity of the stylus further based upon at least in part upon the changes.

15. The memory of claim 13, wherein the memory comprises data defining a vibration pattern, and the operating instructions in the memory further cause the processor to retrieve the vibration pattern from the memory and generate the control signal to correspond to the vibration pattern to cause the actuator to vibrate in accordance with the vibration pattern.

16. The memory of claim 13, wherein the memory comprises statistical information regarding vibrations as a pencil is drawn across paper, and the operating instructions in the memory further cause the processor to retrieve the statistical information from the memory and generate the control signal to correspond to the statistical information to cause the actuator to vibrate according to the statistical information.

17. The memory of claim 13, wherein the sensor comprises an electrostatic sensor to detect a first reference signal provided by a display screen to provide a first sensor signal, and a second reference signal provided by the display screen to provide a second sensor signal, and
wherein the operating instructions in the memory further cause the processor to:
process the first sensor signal by determining a first position of the stylus on the display screen based upon the first sensor signal and the second sensor signal at a first time;
determine a second position of the stylus on the display screen based upon the first sensor signal and the second sensor signal at a second time; and
determine the velocity of the stylus further based at least in part upon a difference between the first position and the second position.

18. The memory of claim 13, wherein the sensor comprises an electrostatic sensor to detect a first reference signal provided by a display screen to provide a first sensor signal and a second reference signal provided by the display screen to provide a second sensor signal; and wherein:
the operating instructions in the memory further cause the processor to:
process the first sensor signal by determining a first position of the stylus on the display screen based upon the first sensor signal and the second sensor signal at a first time; and
process the second sensor signal by determining a second position of the stylus on the display screen based upon the first sensor signal and the second sensor signal at a second time; and
if both the first position and the second position are within a predetermined area on the display screen, to determine the velocity of the stylus further based at least in part upon a difference between the first position and the second position.

19. The memory of claim 13, wherein:
the operating instructions in the memory further cause the processor to:
determine the velocity by determining a time difference between a first occurrence of the one or more of the plurality of sensor signals having a predetermined characteristic corresponding to the physical surface texture and a subsequent occurrence of the one or more of the plurality of sensor signals having the predetermined characteristic.

20. The memory of claim 13, wherein the operating instructions in the memory further cause the processor to:
process the one or more of the plurality of sensor signals to determine whether the stylus is within a predetermined area on the display screen; and
determine the velocity further based at least in part upon the stylus being within the predetermined area.

21. The memory of claim 13, wherein the operating instructions in the memory further cause the processor to:
process the one or more of the plurality of sensor signals to determine a change in position of the stylus; and
determine the velocity further based at least in part upon the change.

22. The memory of claim 13, wherein the sensor further comprises an electrostatic sensor, wherein the plurality of sensor signals comprise electrode identification information of one or more electrodes of the display screen and a measured signal strength between the sensor and each of the one or more electrodes, wherein the electrode identification information includes one or more of a time, a frequency, a code, or an address to permit identification of a corresponding electrode of the one or more electrodes, and
wherein the operating instructions in the memory further cause the processor to:
process a first sensor signal of the plurality of sensor signals to determine a first position of the stylus relative to each of the one or more electrodes based on the electrode identification information and the measured signal strength of the first sensor signal;
process a second sensor signal of the plurality of sensor signals to determine a second position of the stylus relative to each of the one or more electrodes based on the electrode identification information and the measured signal strength of the second sensor signal; and
determine a velocity of the stylus based on the first position, the second position, and a frequency of measuring the plurality of sensor signals.

* * * * *